United States Patent
Jann et al.

(10) Patent No.: US 10,318,253 B2
(45) Date of Patent: Jun. 11, 2019

(54) SMART TEMPLATES FOR USE IN MULTIPLE PLATFORMS

(71) Applicant: SAP SE, Walldorf (DE)

(72) Inventors: Annette Jann, Heidelberg (DE); Kai Richter, Muehltal (DE); Tina Rauschenbach, Mannheim (DE); Ioannis Grammatikakis, Maxdorf (DE); Jan-Michel Blinn, Osthofen (DE); Denis Timur, Mannheim (DE); Roman Rommel, Neustadt an der Weinstrasse (DE); Carlos Martinez Gomez, Heidelberg (DE); Janos Varadi, Ludwigshafen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/461,313

(22) Filed: Mar. 16, 2017

(65) Prior Publication Data

US 2017/0329580 A1 Nov. 16, 2017

Related U.S. Application Data

(60) Provisional application No. 62/335,760, filed on May 13, 2016, provisional application No. 62/335,762, (Continued)

(51) Int. Cl.
*G06F 9/44* (2018.01)
*G06F 8/35* (2018.01)
*G06F 9/451* (2018.01)

(52) U.S. Cl.
CPC ............... *G06F 8/35* (2013.01); *G06F 9/451* (2018.02)

(58) Field of Classification Search
None
See application file for complete search history.

(56) References Cited

U.S. PATENT DOCUMENTS 5,517,663 A 5/1996 Kahn
5,657,462 A 8/1997 Brouwer
(Continued)

OTHER PUBLICATIONS

Ferriero, S. (May 9, 2016). How to create Smart Templates annotations within CDS views—part 1. Retrieved Mar. 27, 2018, from https://blogs.sap.com/2016/05/09/how-to-create-smart-templates-annotations-within-cds-views-part-1/.*
(Continued)

*Primary Examiner* — Matthew J Brophy
(74) *Attorney, Agent, or Firm* — Fish & Richardson P.C.

(57) ABSTRACT

In one general aspect, a method for creating an enterprise application can include receiving, by a computing device, a selection of a project for creating using a template, receiving, by the computing device, a selection of an application for the project, receiving information for associating with the application, receiving a selection of a data source, receiving a selection of a core data service from a group of core data services associated with the data source, the core data service utilizing a smart template, receiving a selection of a data service that utilizes the selected core data service, receiving a selection of an annotated data service, and creating the enterprise application. The creating can be based on the smart template. The creating can utilize the received information for associating with the application, the data source, the core data service, the data service, and the annotated data service.

20 Claims, 38 Drawing Sheets

Related U.S. Application Data filed on May 13, 2016, provisional application No. 62/335,765, filed on May 13, 2016, provisional application No. 62/335,767, filed on May 13, 2016, provisional application No. 62/335,888, filed on May 13, 2016, provisional application No. 62/335,892, filed on May 13, 2016, provisional application No. 62/335,895, filed on May 13, 2016, provisional application No. 62/335,897, filed on May 13, 2016, provisional application No. 62/335,899, filed on May 13, 2016, provisional application No. 62/335,873, filed on May 13, 2016, provisional application No. 62/335,875, filed on May 13, 2016.

(56) References Cited

U.S. PATENT DOCUMENTS

| | | | | |
|---|---|---|---|---|
| 5,682,469 | A | 10/1997 | Linnett | |
| 5,727,950 | A | 3/1998 | Cook | |
| 5,754,174 | A | 5/1998 | Carpenter | |
| 5,877,759 | A | 3/1999 | Bauer | |
| 6,025,841 | A | 2/2000 | Finkelstein | |
| 6,085,184 | A | 7/2000 | Bertrand | |
| 6,262,730 | B1 | 7/2001 | Horvitz | |
| 6,735,632 | B1 | 5/2004 | Kiraly | |
| 6,751,606 | B1 | 6/2004 | Fries | |
| 6,788,313 | B1 | 9/2004 | Heil | |
| 6,845,486 | B2 | 1/2005 | Yamada | |
| 6,892,349 | B2 | 5/2005 | Shizuka | |
| 7,441,190 | B2 | 10/2008 | Asami | |
| 7,603,375 | B2 * | 10/2009 | Ng | G06F 16/252 |
| 7,636,045 | B2 | 12/2009 | Sugiyama | |
| 7,797,146 | B2 | 9/2010 | Harless | |
| 7,797,338 | B2 | 9/2010 | Feng | |
| 7,933,399 | B2 | 4/2011 | Knott | |
| 7,966,269 | B2 | 6/2011 | Bauer | |
| 8,225,231 | B2 | 7/2012 | Zielinski | |
| 8,978,010 | B1 * | 3/2015 | Thumfart | G06F 8/433 717/123 |
| 9,176,801 | B2 * | 11/2015 | Baeuerle | G06F 16/212 |
| 9,202,171 | B2 | 12/2015 | Kuhn | |
| 9,223,549 | B1 * | 12/2015 | Hermanns | G06F 8/34 |
| 9,703,458 | B2 | 7/2017 | Sasaki | |
| 9,740,462 | B2 * | 8/2017 | Rao | G06F 8/33 |
| 9,807,145 | B2 | 10/2017 | Koon | |
| 2002/0005865 | A1 | 1/2002 | Hayes-Roth | |
| 2002/0149611 | A1 | 10/2002 | May | |
| 2003/0020671 | A1 | 1/2003 | Santoro | |
| 2003/0028498 | A1 | 2/2003 | Hayes-Roth | |
| 2004/0056878 | A1 | 3/2004 | Lau | |
| 2004/0075677 | A1 | 4/2004 | Loyall | |
| 2004/0179659 | A1 | 9/2004 | Byrne | |
| 2005/0039127 | A1 | 2/2005 | Davis | |
| 2006/0041848 | A1 | 2/2006 | Lira | |
| 2006/0136223 | A1 | 6/2006 | Brun | |
| 2006/0253791 | A1 | 11/2006 | Kuiken | |
| 2006/0271398 | A1 | 11/2006 | Belcastro | |
| 2007/0083821 | A1 | 4/2007 | Garbow | |
| 2007/0226241 | A1 * | 9/2007 | Ng | G06F 16/252 |
| 2008/0096533 | A1 | 4/2008 | Manfredi | |
| 2008/0155409 | A1 | 6/2008 | Santana | |
| 2009/0153335 | A1 | 6/2009 | Birtcher | |
| 2009/0248695 | A1 | 10/2009 | Ozzie | |
| 2011/0283215 | A1 | 11/2011 | Dunn | |
| 2012/0216125 | A1 | 8/2012 | Pierce | |
| 2012/0253788 | A1 | 10/2012 | Heck | |
| 2012/0254227 | A1 | 10/2012 | Heck | |
| 2012/0265528 | A1 | 10/2012 | Gruber | |
| 2013/0152017 | A1 | 6/2013 | Song | |
| 2013/0159484 | A1 * | 6/2013 | S | G06F 8/30 709/223 |
| 2013/0174034 | A1 | 7/2013 | Brown | |
| 2013/0204813 | A1 | 8/2013 | Master | |
| 2014/0040748 | A1 | 2/2014 | Lemay | |
| 2014/0068459 | A1 | 3/2014 | Graham | |
| 2014/0074483 | A1 | 3/2014 | Van Os | |
| 2014/0337770 | A1 | 11/2014 | Sasaki | |
| 2014/0344024 | A1 | 11/2014 | Kempf | |
| 2015/0006135 | A1 * | 1/2015 | Deb | G06F 8/34 703/6 |
| 2015/0040104 | A1 | 2/2015 | Mall | |
| 2015/0074069 | A1 * | 3/2015 | Baeuerle | G06F 16/212 707/702 |
| 2015/0074081 | A1 * | 3/2015 | Falter | G06F 16/2433 707/713 |
| 2015/0089373 | A1 | 3/2015 | Dwivedi et al. | |
| 2015/0089403 | A1 * | 3/2015 | Zhu | G06F 8/38 715/762 |
| 2015/0123993 | A1 | 5/2015 | Ohba | |
| 2015/0142852 | A1 * | 5/2015 | Lippert | G06F 21/6227 707/785 |
| 2015/0161180 | A1 * | 6/2015 | Hermanns | G06F 16/212 707/810 |
| 2015/0186156 | A1 | 7/2015 | Brown | |
| 2015/0195406 | A1 | 7/2015 | Dwyer | |
| 2015/0339036 | A1 | 11/2015 | Hwang | |
| 2015/0382047 | A1 | 12/2015 | Van Os | |
| 2016/0062745 | A1 * | 3/2016 | Rao | G06F 8/33 717/109 |
| 2016/0070580 | A1 | 3/2016 | Johnson | |
| 2016/0094497 | A1 | 3/2016 | Javed | |
| 2017/0177650 | A1 * | 6/2017 | Devine | G06F 16/2455 |
| 2017/0329466 | A1 | 11/2017 | Krenkler et al. | |
| 2017/0329468 | A1 | 11/2017 | Schon et al. | |
| 2017/0329479 | A1 | 11/2017 | Rauschenbach et al. | |
| 2017/0329483 | A1 | 11/2017 | Jann et al. | |
| 2017/0329499 | A1 | 11/2017 | Rauschenbach et al. | |
| 2017/0329500 | A1 | 11/2017 | Grammaikakis et al. | |
| 2017/0329505 | A1 | 11/2017 | Richter et al. | |
| 2017/0329580 | A1 * | 11/2017 | Jann | G06F 9/451 |
| 2017/0329581 | A1 | 11/2017 | Jann et al. | |
| 2017/0329614 | A1 | 11/2017 | Schon et al. | |
| 2017/0331915 | A1 | 11/2017 | Jann et al. | |
| 2017/0344218 | A1 | 11/2017 | Jann et al. | |
| 2017/0346949 | A1 | 11/2017 | Sanghavi | |

OTHER PUBLICATIONS

Ferriero, S. (May 9, 2016). How to create Smart Templates annotations within CDS views—part 2. Retrieved Mar. 27, 2018, from https://blogs.sap.com/2016/05/09/how-to-create-smart-templates-annotations-within-cds-views-part-2/.*

Ferriero, S. (May 9, 2016). How to create Smart Templates annotations within CDS views—part 3. Retrieved Mar. 27, 2018, from https://blogs.sap.com/2016/05/09/how-to-create-smart-templates-annotations-within-cds-views-part-3/.*

Cheng, Steven. Odata Programming Cookbook for .Net Developers. Packt Publishing Ltd, 2012. (Year: 2012).*

"SAP Blog Part 1", Ferriero, S. (May 9, 2016), How to create smart Templates annotations within CDS views—Part 1. [Retrieved Oct. 8, 2018] https://blogs.sap.com/2016/05/09/how-to-create-smart-templates-annotations-within-cds-views-part-1 (17 pages).

"Sap Blog Part 2", Ferriero, S. (May 9, 2016), How to create smart Templates annotations within CDS views—Part 2. [Retrieved Oct. 8, 2018] https://blogs.sap.com/2016/05/09/how-to-create-smart-templates-annotations-within-cds-views-part-2 (15 pages).

EP Extended European Search Report for European Appln. No. 17000813.0, dated Aug. 23, 2017, 7 pages.

U.S. Non-Final Office Action in U.S. Appl. No. 15/390,262, dated Nov. 30, 2018, 18 pages.

U.S. Non-Final Office Action in U.S. Appl. No. 15/461,290, dated Jun. 22, 2018, 18 pages.

U.S. Non-Final Office Action in U.S. Appl. No. 15/461,296, dated Dec. 11, 2018, 26 pages.

U.S. Non-Final Office Action in U.S. Appl. No. 15/461,330, dated Aug. 10, 2018, 14 pages.

U.S. Non-Final Office Action in U.S. Appl. No. 15/462,084, dated Nov. 21, 2018, 15 pages.

(56) References Cited

OTHER PUBLICATIONS

U.S. Non-Final Office Action in U.S. Appl. No. 15/591,989, dated Nov. 14, 2018, 15 pages.

* cited by examiner

Basic Information

New Smart Template Application
*Basic Information*

Project Name [My Project] — 428

*App Descriptor Data*

Title [Presentation Test] — 422a
Namespace [ ] — 422b
Description [abc] — 422c
Application Component Hierarchy [ ] — 422d
Enterprise Application ID [ ] — 422e
Development Path [ ] — 422f

[Previous] 426   [Next] 424

New Smart Template Application
*Annotation Selection*

| Annotation Selection | 471 |

+ Add Annotated Files

| Rank | Name | Source | |
|---|---|---|---|
| 1 | Selected Service Metadata | Remote | 472a |
| 2 | STTA_PROD_MAN_ANNO_MDL | Remote | 472b |

[ Previous ] 476  [ Next ] 474

```
define view Product ... {                                       ← 600
  @UI: {
    lineItem: {position: 30, importance: #HIGH},    ← 602
    selectionField: {position: 20}     ← 604
  }
  @Semantics.amount.currencyCode: 'Currency'     ← 606
  Price, @ObjectModel: {            ← 608
    mandatory: true,
    foreignKey.association: '_Currency'    ← 610
  }
  @Semantics.currencyCode: true     ← 612
  Currency,
  ...
}
```

FIG. 6

```
<Annotation Term="UI.HeaderInfo">                    ⎯840
 <Record>
  <PropertyValue Property="TypeName" String="Product"/>
  <PropertyValue Property="ImageUrl" Path="ProductPictureURL"/>
  <PropertyValue Property="Title">
   <Record Type="UI.DataField">
    <PropertyValue Property="Value" Path="Product_Text"/>
   </Record>
  </PropertyValue>
  <PropertyValue Property="Description">
   <Record Type="UI.DataField">
    <PropertyValue Property="Value" Path="Product"/>
   </Record>
  </PropertyValue>
 </Record>
</Annotation>

<Annotation Term="UI.DataPoint" Qualifier="ProductCategory">
 <Record>                                             ⎯842
  <PropertyValue Property="Title" String="Category"/>
  <PropertyValue Property="Value" Path="ProductCategory"/>
 </Record>
</Annotation>
<Annotation Term="UI.DataPoint" Qualifier="ProductPrice">
 <Record>                                             ⎯844
  <PropertyValue Property="Title" String="Price"/>
  <PropertyValue Property="Value" Path="Price" />
 </Record>
</Annotation>
```

FIG. 8B

```
<Annotation Term="UI.Facets">                      ⎱
  <Collection>                                       846a
    <Record Type="UI.CollectionFacet">
      <PropertyValue Property="Label" String="Product Information"/>
      <PropertyValue Property="Facets">
        <Collection>
          <Record Type="UI.ReferenceFacet">
            <PropertyValue Property="Label" String="..."/>
            <PropertyValue Property="Target"
              AnnotationPath="@UI.FieldGroup#GeneralInformation"/>
          </Record>
          <Record Type="UI.ReferenceFacet">...</Record>
          <Record Type="UI.ReferenceFacet">...</Record>
        </Collection>
      </PropertyValue>
    </Record>
    <Record Type="UI.ReferenceFacet">
      <PropertyValue Property="Label" String="Product Description"/>
      <PropertyValue Property="Target"
        AnnotationPath=" to_ProductText/@UI.LineItem"/>
    </Record>
    <Record Type="UI.ReferenceFacet">
      <PropertyValue Property="Label"  String="Supplier"/>
      <PropertyValue Property="Target"
        AnnotationPath="to_Supplier/@UI.Identification"/>
    </Record> ...
```

FIG. 8C

```
<Annotation Term="UI.Facets">                    846b
 <Collection>
  <Record Type="UI.CollectionFacet">
   <PropertyValue Property="Label" String="Product Information"/>
   <PropertyValue Property="Facets">
    <Collection>
     <Record Type="UI.ReferenceFacet">
      <PropertyValue Property="Label"
         String="General Information"/>
      <PropertyValue Property="Target" AnnotationPath="..."/>
     </Record>
     <Record Type="UI.ReferenceFacet">...</Record>
     <Record Type="UI.ReferenceFacet">...</Record>
    </Collection>
   </PropertyValue>
  </Record>
  <Record Type="UI.ReferenceFacet">
    <PropertyValue Property="Label" String="Product Description"/>
    <PropertyValue Property="Target" AnnotationPath="..."/>
  </Record>
  <Record Type="UI.ReferenceFacet">
    <PropertyValue Property="Label"  String="Supplier"/>
    <PropertyValue Property="Target" AnnotationPath="..."/>
  </Record> ...
```

FIG. 8D

```
<Annotation Term="UI.FieldGroup" Qualifier="GeneralInformation">
  <Record>                                                              ⟩―848
    <PropertyValue Property="Label" String="General Information"/>
    <PropertyValue Property="Data">
      <Collection>
        <Record Type="UI.DataField">
          <PropertyValue Property="Label" Path="Product ID"/>
          <PropertyValue Property="Value" Path="Product"/>
        </Record>
        <Record Type="UI.DataField"> ...
          <PropertyValue Property="Value" Path="ProductCategory"/>
        </Record>
        <Record Type="UI.DataField"> ...
          <PropertyValue Property="Value" Path="SupplierUUID"/>
        </Record>
        <Record Type="UI.DataField">
          <PropertyValue Property="Value" Path="Price"/>
        </Record>
      </Collection>
      <Annotations
Target="SEPMRA_PROD_MAN.SEPMRA_I_ProductWithDraftType/Price">
        <Annotation Term="Common.Label" String="Price">
        </Annotations> ...
```

```
<Annotations
  Target="SEPMRA_PROD_MAN.SEPMRA_I_ProductWithDraftType/Price">
  <Annotation Term="Measures.ISOCurrency" Path="Currency">
</Annotations>                                                          ⟩―850
...
or as $metadata extension:
<EntityType Name="SEPMRA_I_ProductWithDraftType">
  <Property Name="Price" Type="Edm.Decimal" sap:unit="Currency"...>
  <Property Name="Currency" Type="Edm.String"
        sap:semantics="currency-code" /> ...
```

FIG. 8E

```
Usage of Text Annotations (Common.Text)                              ⟩-852
<Annotations Target=
  "SEPMRA_PROD_MAN.SEPMRA_I_ProductWithDraftType/ProductBaseUnit">
 <Annotation Term="Common.Text"
         Path="to_ProductBaseUnit/UnitOfMeasure_Text">
</Annotations>
<Annotations>

Target="SEPMRA_PROD_MAN.SEPMRA_I_ProductWithDraftType/SupplierUUID">
 <Annotation Term="Common.Text" Path="to_Supplier/CompanyName">
</Annotations>
...
```

```
Usage of Contact Annotations (Communication.Contact)
<Annotations Target="SEPMRA_PROD_MAN.SEPMRA_I_SupplierType">
  <Annotation Term="Communication.Contact">
   <Record>                                                          ⟩-854
    <PropertyValue Property="fn" Path="CompanyName"/>
    <PropertyValue Property="email">
    <Record>
      <PropertyValue Property="address" Path="EmailAddress"/>
      <PropertyValue Property="type"
        EnumMember="ContactInformationType/work"/>
   ...
</Annotations>
or
<Annotations
Target="SEPMRA_PROD_MAN.SEPMRA_I_SupplierType/EmailAddress">
  <Annotation Term="Communication.IsEmailAddress">
</Annotations>
```

```
Usage of UI.DataFieldWithUrl or UI.DataFieldForIntentBasedNavigation
<Record Type="UI.DataFieldWithUrl">                                  ⟩-856
 <PropertyValue Property="Value" Path="SupplierUUID"/>
 <PropertyValue Property="Url" Path="SupplierWebSite"/>...
```

FIG. 8F

```
Default for filter:
<Annotations Target="ManageProducts.SEPMRA_I_ProductWithDraftType">
  <Annotation Term="UI.SelectionFields">
    <Collection>
      <PropertyPath>ProductCategory</PropertyPath>                    ⟩─932
    </Collection>
  </Annotation>
...required in filter:
<Annotations Target=
  "ManageProducts.SEPMRA_PROD_MAN_Entities/SEPMRA_I_ProductWithDraft">
  <Annotation Term="Capabilities.FilterRestrictions">
    <Record>
      <PropertyValue Property="RequiredProperties">
        <Collection>
          <PropertyPath>ProductCategory</PropertyPath>
        </Collection>
...or in $metadata:
<EntityType Name="SEPMRA_I_ProductWithDraftType">
  <Property Name="ProductCategory" sap:required-in-filter="true"...>
```

```
<Annotations Target=
  "ManageProducts.SEPMRA_PROD_MAN_Entities/SEPMRA_I_ProductWithDraft">
  <Annotation Term="Capabilities.SearchRestrictions">
    <Record> <!-- optional, default value is true -->                 ⟩─930
      <PropertyValue Property="Searchable" Bool="true">
    </Record>
...or in $metadata:
<EntitySet Name="SEPMRA_I_ProductWithDraft" sap:searchable="true"...>
```

FIG. 9B

```
<Annotation Term="UI.LineItem">
<Collection>
<!-- this action data field is shown in the list toolbar -->
<Record Type="UI.DataFieldForAction">
  ...
  <PropertyValue Property="Label" String="Copy" />
  <PropertyValue Property="Action" String=
    "ManageProducts.SEPMRA_PROD_MAN_Entities/
    SEPMRA_I_ProductWithDraftCopy" />
</Record> ...
```
— 934

```
<Annotations Target=
"ManageProducts.SEPMRA_PROD_MAN_Entities/SEPMRA_I_ProductWithDraft">
<Annotation Term="Capabilities.InsertRestrictions">
<Record> <!-- optional, default value is true -->
  <PropertyValue Property="Insertable" Bool="true">
</Record>
...or in $metadata (optional, since default value is true):
<EntitySet Name="SEPMRA_I_ProductWithDraft" sap:creatable="true" ...>
```
— 936

FIG. 9C

```
<Annotation Term="UI.LineItem">
  <Collection>
    <Record Type="UI.DataField">
    ...
      <PropertyValue Property="Value" Path="Product"/>
    </Record>
    <Record Type="UI.DataField">
    ...
      <PropertyValue Property="Value" Path="ProductCategory"/>
    </Record>
    <Record Type="UI.DataField">
    ...
      <PropertyValue Property="Value" Path="Product_Text"/>
    </Record>
    <Record Type="UI.DataField">
    ...
      <PropertyValue Property="Value" Path="Price"/>
    </Record> ...
```
⎯ 938

```
Usage of Text Annotations (Common.Text)
<Annotations Target=
"SEPMRA_PROD_MAN.SEPMRA_I_ProductWithDraftType/Product">
  <Annotation Term="Common.Text" Path=„Product_Text">
</Annotations>
... or in $metadata:
<EntityType Name="SEPMRA_I_ProductWithDraftType">
  <Property Name="Product" sap:text="Product_Text"...>
```
⎯ 940

```
Usage of Unit Annotations (Measures.Unit, Measures.ISOCurrency)
<Annotations Target=
  "SEPMRA_PROD_MAN.SEPMRA_I_ProductWithDraftType/Price">
  <Annotation Term="Measures.ISOCurrency" Path="Currency">
</Annotations>
... or in $metadata:
<EntityType Name="SEPMRA_I_ProductWithDraftType">
  <Property Name="Price" sap:unit="Currency"...>
  <Property Name="Currency" sap:semantics="currency-code"...>
```
⎯ 942

FIG. 9D

SMART TEMPLATES FOR USE IN MULTIPLE PLATFORMS

CROSS REFERENCE TO RELATED APPLICATIONS

This application claims priority to and the benefit of U.S. Provisional Application No. 62/335,760, filed May 13, 2016, U.S. Provisional Application No. 62/335,762, filed May 13, 2016, U.S. Provisional Application No. 62/335,765, filed May 13, 2016, U.S. Provisional Application No. 62/335,767, filed May 13, 2016, U.S. Provisional Application No. 62/335,888, filed May 13, 2016, U.S. Provisional Application No. 62/335,892, filed May 13, 2016, U.S. Provisional Application No. 62/335,895, filed May 13, 2016, U.S. Provisional Application No. 62/335,897, filed May 13, 2016, U.S. Provisional Application No. 62/335,899, filed May 13, 2016, U.S. Provisional Application No. 62/335,873, filed May 13, 2016, U.S. Provisional Application No. 62/335,875, filed May 13, 2016, each of which is incorporated by reference in its entirety.

TECHNICAL FIELD

This description generally relates to user interfaces. The description, in particular, relates to systems and techniques for providing a user interface experience for viewing data and information related to multiple software applications.

BACKGROUND

A user of software applications designed to support processes used by an enterprise often needs to navigate back and forth between multiple (and in many cases different) user interfaces and application instances in order to carry out transactional tasks when making a viable decision for the enterprise. In many cases, the navigation can include viewing data and information related to multiple applications. While navigating between the various user interfaces and application instances, the user may become lost and confused, losing a context of a current transactional task. This can create major usability issues, resulting in the inability of the user to effectively carryout the transactional tasks. In general, the user has a poor user experience using and interacting with the software applications.

SUMMARY

According to one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method for creating an enterprise application can include receiving, by a computing device, a selection of a project for creating using a template, receiving, by the computing device, a selection of an application for the project, receiving information for associating with the application, receiving a selection of a data source, receiving a selection of a core data service from a group of core data services associated with the data source, the core data service utilizing a smart template, receiving a selection of a data service that utilizes the selected core data service, receiving a selection of an annotated data service, and creating the enterprise application. The creating can be based on the smart template. The creating can utilize the received information for associating with the application, the data source, the core data service, the data service, and the annotated data service.

Implementations may include one or more of the following features. For example, the creating of the enterprise application can be performed using a web Integrated Development Environment (IDE). The web IDE can execute on a web browser executing on the computing device. The data source, the core data service, the data service, and the annotated data service can be included for selection in a data connection tab of the web IDE. The data source can be an annotated Open Data Protocol (OData) source. The application can be a smart template application. The data service can be an OData service. The annotated service can be an OData annotated service. The smart template application can use predefined template views and controllers that use the OData service and the OData annotated service. The OData annotated service can add semantics and structures to data provided by the data source. The smart template application can use the predefined template views and controllers at runtime to generate at least one view for the enterprise application.

In another general aspect, a non-transitory, machine-readable medium has instructions stored thereon. The instructions, when executed by a processor, cause a computing device to receive a selection of a project for creating using a template, receive a selection of an application for the project, receive information for associating with the application, receive a selection of a data source, receive a selection of a core data service from a group of core data services associated with the data source, the core data service utilizing a smart template, receive a selection of a data service that utilizes the selected core data service, receive a selection of an annotated data service, and create an enterprise application. The creating can be based on the smart template. The creating can utilize the received information for associating with the application, the data source, the core data service, the data service, and the annotated data service.

Implementations may include one or more of the following features. For example, the instructions when executed by the processor can further cause the computing device to create the enterprise application using a web Integrated Development Environment (IDE). The instructions when executed by the processor that further cause the computing device to create the enterprise application using a web Integrated Development Environment (IDE) can execute on a web browser executing on the computing device. The data source, the core data service, the data service, and the annotated data service can be included for selection in a data connection tab of the web IDE. The data source can be an annotated Open Data Protocol (OData) source. the application can be a smart template application. The data service can be an OData service. The annotated service can be an OData annotated service. The smart template application can use predefined template views and controllers that use the OData data service and the OData annotated service. The OData annotated service can add semantics and structures to data provided by the data source. The smart template application can use the predefined template views and controllers at runtime to generate at least one view for the enterprise application.

In yet another general aspect, a system can include at least one memory including instructions on a computing device, and at least one processor on the computing device. The processor can be operably coupled to the at least one memory and can be arranged and configured to execute the instructions that, when executed, cause the processor to implement receiving, by the computing device, a selection of a project for creating using a template, receiving, by the computing device, a selection of an application for the project, receiving information for associating with the application, receiving a selection of a data source, receiving a selection of a core data service from a group of core data services associated with the data source, the core data service utilizing a smart template, receiving a selection of a data service that utilizes the selected core data service, receiving a selection of an annotated data service, and creating an enterprise application. The creating can be based on the smart template. The creating can utilize the received information for associating with the application, the data source, the core data service, the data service, and the annotated data service.

Implementations may include one or more of the following features. For example, the application can be a smart template application. The data service can be an OData service. The annotated service can be an OData annotated service. The smart template application can use predefined template views and controllers that use the OData service and the OData annotated service. The OData annotated service can add semantics and structures to data provided by the data source. The smart template application can use the predefined template views and controllers at runtime to generate at least one view for the enterprise application.

The details of one or more implementations are set forth in the accompanying drawings and the description below. Other features will be apparent from the description and drawings, and from the claims.

BRIEF DESCRIPTION OF THE DRAWINGS

FIG. 4C illustrates example information for use in creating and generating an enterprise application.

FIG. 4G illustrates example annotated files for use when creating and generating an enterprise application.

FIG. 5B shows another example UI for an enterprise application that utilizes a smart template.

FIG. 6 shows example source code for an example core data service (CDS) for a product view that includes semantic information.

FIGS. 8A-F show smart templates as applied to the development of an object page.

FIGS. 9A-D show smart templates as applied to the development of a list report.

Like reference symbols in the various drawings indicate like elements.

DETAILED DESCRIPTION

Figure 1A:
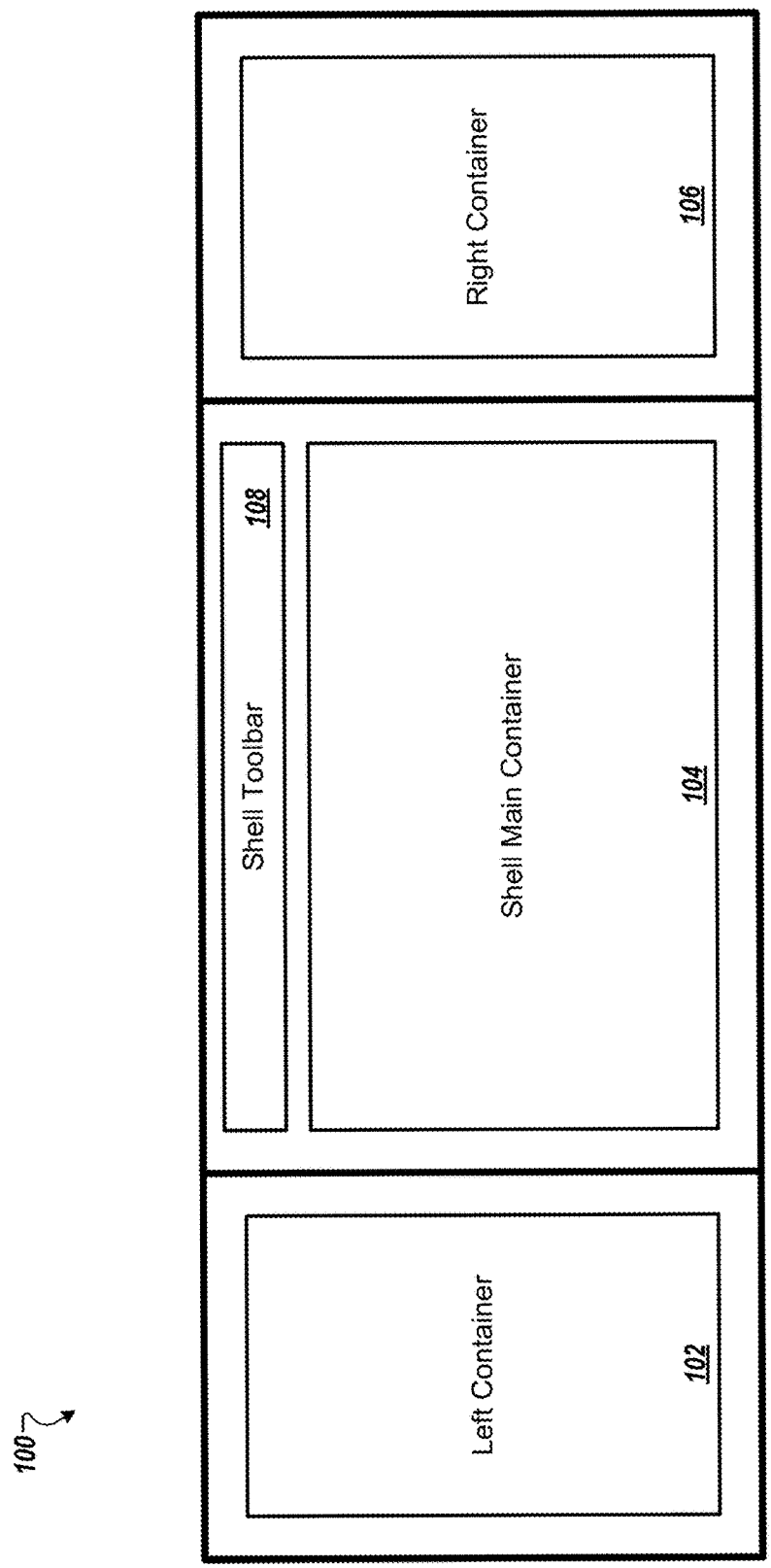
FIG. 1A is an illustration of a user interface entry point (a viewport) for a particular user experience.

Enterprise transactional applications can evolve from large monolithic on-premise software deployments into multiple (e.g., hundreds of, thousands of) small, componentized applications that can execute (run) on various types of computing devices and network platforms. For example, the fifth version of Hypertext Markup Language (HTML5) can be used as a basis for structuring and presenting an application platform that includes a grid matrix-style home screen or dashboard-like user interface. The use of HTML5 can provide an improved user experience, can reduce a user interface complexity, and may increase user productivity across multiple types of computing devices. The computing devices can include, but are not limited to, desktop computers and mobile computing devices such as laptop computers, tablet computers, notebook computers, personal digital assistants (PDAs), smartphones, mobile phones, smart watches, etc.).

In some cases, the grid matrix-style home screen or dashboard-like user interface allows a user to open and access a selected application. In some cases, the grid matrix-style home screen or dashboard-like user interface allows a user to access content within an application. These user interfaces can present user experience (UX) and user interface (UI) shortcomings while attempting to provide optimized usability and user-centric business functionalities related to transactional tasks.

For example, users may need to navigate back and forth between multiple screens that can include home screens, application instances, and drill downs, in order to perform various transactional tasks to make viable business decisions. The user may need to navigate back and forth between multiple screens when viewing related data between various applications.

For example, applications and application instances may not interoperate with each other. Because of this, user navigation and operations may not be minimized. Applications may not readily access relative content without first needing to open an application instance and then perform numerous navigations.

In order to improve a user experience (UX), a user interface can be implemented to intuitively propose relative context or intent to a user. A user interface can be implemented to conform to, recognize, and facilitate ways in which a user may personally work. A user interface can be implemented to help a user remember important tasks. The use of such a "smart" user interface can help a user easily manage and keep track of the context of current tasks and activities when carrying out transactional tasks.

A shortcoming of a UX and a UI can be a lack of relative business contexts related to user roles and expertise that can empower employees to do their job better, faster, and in a more deliberate way. Providing a user with a way to personalize an experience of the user based on a role requirement of the user can result in a better overall user experience. For example, the personalization can result in a UI automatically providing proposals for transactional tasks that the user may need to see. The proposals can be provided at a time when the user wants to see the proposal and on a computing device chosen by the user. The proposals can be provided to the user as a result of a single click or gesture input to the user interface by the user. The UI can be considered a central interface that can provide a user with the ability to communicate, collaborate, initiate, and/or respond to colleagues, managers, and customers without leaving the context of their current activity or application.

Alternatively, a user may have to navigating through multiple applications and user interfaces. A user may easily lose a context of a current task or activity while having to navigate through user interfaces provided in a multiple application environment for an enterprise. The loss of context can affect the ability of the user to effectively carryout a transactional task. In addition, navigating through user interfaces provided in a multiple application environment may not allow a user to readily view, at a glance, live data that may be relevant to personal and professional daily activities, responsibilities and organizational accountabilities of the user. The user may not be provided with a way to efficiently manage hundreds (or thousands) of applications associated with transactional workflows in the enterprise.

Enterprise applications that are associated with transactional workflows in an enterprise can be implemented using a software development technology or foundation (e.g., HTML5/CSS/JS technology) in a particular UI framework (e.g., SAPUI5) in order to provide a beneficial UX and UI.

The enterprise applications can be implemented to execute or run on multiple different types of computing devices such as desktop computers and mobile computing devices (e.g., laptop computers, tablet computers, notebook computers, personal digital assistants (PDAs), smartphones, mobile phones, smart watches, etc.).

For example, the UI may use elements of a particular UX (e.g., an SAP Fiori® UX) to provide a user with a personalized, responsive, seamless, and simple user experience across enterprise applications (including legacy and new), across different types of computing devices such as desktop computers and mobile computing devices (e.g., laptop computers, tablet computers, notebook computers, personal digital assistants (PDAs), smartphones, mobile phones, smart watches, etc.), and across all possible deployment options (e.g., on-premise, cloud, as-a-service, etc.).

The particular UX can deploy an array of interactive features and process tools that can be integrated with a suite or set of enterprise applications that have specific functionalities. The particular UX can provide intelligent, contextual-based support for users across an enterprise. The particular UX can use a "push" model that can anticipate tasks (e.g., transactional tasks) for a user based on a role of the user in the enterprise. The particular UX can import real-time data that can be tailored to specific tasks. The software for the UI for the particular UX can be implemented to easily and transparently scale the UI accordingly for display on each display device included in each of the different possible computing devices that can execute (run) the enterprise applications.

The particular UX can be personalized, responsive, simplified, and optimized, enabling and empowering users by providing a consistent and coherent view across target computing devices, making a suite or set of enterprise applications easier and more intuitive to use. The particular UX can be designed for a specific user. Complex applications can be decomposed into task-based experiences with a central entry point for each specific user. The can support how, when, and where a user works. The particular UX can dynamically adapt to meet the requirements of multiple computing devices, versions, and channels to provide a common user experience. The particular UX can reduce the time needed by a user to complete routine tasks by providing a role-based experience and contextual information, by supporting the effective presentation of real-time information, and by offering efficient navigation paradigms.

FIG. 1A is an illustration of a UI entry point (a viewport 100) for a particular UX. The viewport 100 can be a single-screen view partitioned into multiple (e.g., three) multifunctional screen areas (e.g., a left screen area (left container 102, a center screen area (shell main container 104), and a right screen area (right container 106) for display in a display area (on a display device) included in a computing device. The viewport 100 can include a shell toolbar 108. The shell toolbar 108 can include a global search and other services, which are available to a user across all enterprise applications.

The shell main container 104 can display information for use as a main workspace for the UX. In some implementations, multiple different screens can be displayed in the shell main container 104. For example, a login screen, a launchpad screen, and an overview page can alternatively be displayed in the shell main container 104. The viewport 100 can provide a user with a screen orientation that can allow the user access to application information. The viewport 100 can provide the user with a UX and UI the includes the business functionalities and enterprise application-to-application navigations needed by the user without disrupting a context of a current task of the user.

Figure 1B:
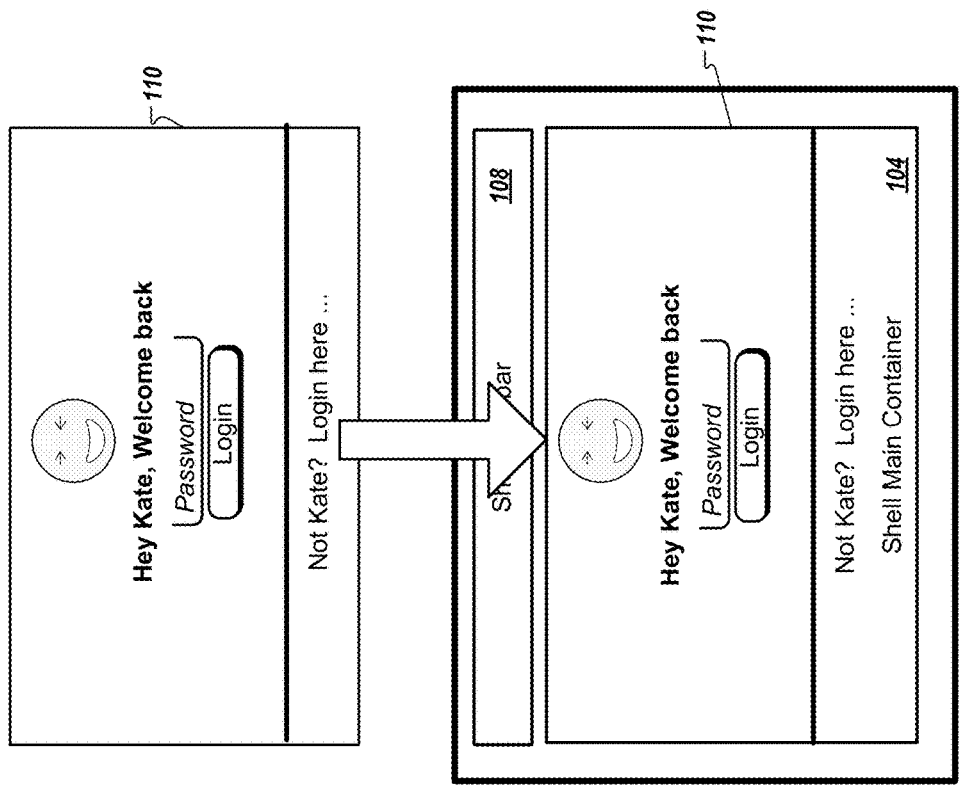
FIG. 1B is an illustration showing an example login screen displayed in a shell main container.

FIG. 1B is an illustration showing an example login screen 110 displayed in the shell main container 104. The login screen 110 provides a UI that allows a user to enter credentials in order to log into and begin a personalized and customized UX. In the example shown in FIG. 1B, the login screen 110 appears to drop into the shell main container 104 from a virtual extension area located along a top of a display area. In some implementations, the virtual extension area can be placed along the bottom of the display area. In some implementations, the virtual extension area can be placed to the left and/or the right of the display area.

Figure 1C:
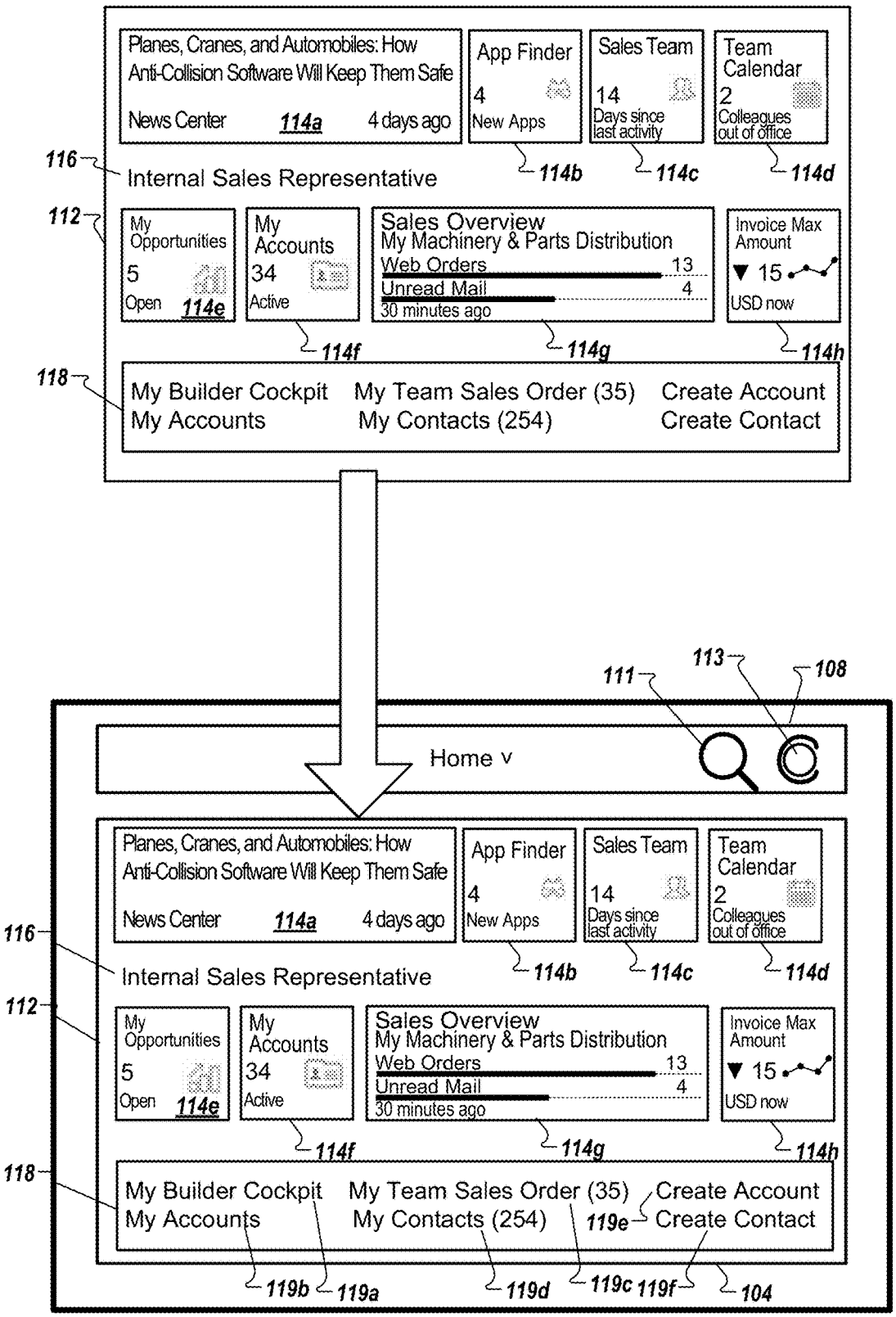
FIG. 1C is an illustration showing an example launchpad displayed in a shell main container.

FIG. 1C is an illustration showing an example launchpad 112 displayed in the shell main container 104. The launchpad 112 can be a web-based entry point (or homepage) for enterprise applications that can execute (run) across multiple platforms and computing devices. In the example shown in FIG. 1C, the launchpad 112 appears to drop into the shell main container 104 from the top of a display area. In some implementations, the virtual extension area can be placed along the bottom of the display area. In some implementations, the virtual extension area can be placed to the left and/or the right of the display area.

The launchpad 112 can serve as a bracket around (or a base for) a set (or group) of enterprise applications, providing a single point of entry for the set of enterprise applications. In the example shown in FIG. 1C, the launchpad 112 presents (displays on a screen of a computing device of a user) each application represented by a tile. A tile can be a container that represents the application. Each tile can display different types of content. A user can interact with each tile to navigate to the specific enterprise application associated with the tile. In addition, when designing a tile to represent a specific application, a programmer can assign a tile to a specific user or group of users. The launchpad 112 can provide one or more services. The one or more services can include, but are not limited to, application-to-application navigation, personalization, role-based application assignments, search, and incident creation.

For example, complex applications can be decomposed into a task-based experience with a central entry point for each user of the application. The launchpad 112 can be a role based, personalized, real-time and contextual aggregation point for business applications and analytics. The launchpad 112 can run (execute) on multiple computing devices including, but not limited to, desktop computers and mobile computing devices such as laptop computers, tablet computers, notebook computers, personal digital assistants (PDAs), smartphones, mobile phones, smart watches, etc.). In addition, the launchpad 112 can be deployed on multiple platforms (e.g., Linux, Windows, Windows Phone, MAC®, iOS®, OS X®, Android®, etc.).

The launchpad 112 includes tiles 114a-h. Each tile can display different types of content. For example, tile 114a can be a news and feeds tile that can enhance collaboration by providing a user with information about the enterprise. The tiles 114a-h can be individually color-coded. A color can represent a particular role (e.g., finance, human resources, supply chain management (SCM), customer relationship management (CRM), etc.). The tiles 114a-h can be associated with a group 116. Tile 114f can be a key performance indicator (KPI) tile. Tile 114b can be a basic launch tile. Tile 114d can be a monitoring tile. Tile 114g can display a comparison chart for specific content.

The launchpad 112 includes a link list area 118 that includes links 119a-f. The link list area 118 is an area on the launchpad 112 that can provide links to enterprise applications represented by the tiles 114a-h. For example, a user can select and drag a tile from the tile area on the launchpad 112 into the link list area 118 to create a link to the application associated with (represented by) the tile. In some implementations, the launchpad 112 can include a footer toolbar (e.g., footer toolbar 132 as shown in FIG. 1F). In some implementations, the footer toolbar can appear to float over the content displayed in the launchpad 112.

In some implementations, the shell toolbar 108 can display a search icon 111 and a copilot launch icon 113. A user can select (click on) the copilot launch icon 113 to launch a copilot UI. A copilot UI will be described in more detail with reference to FIG. 1I.

Figure 1D:
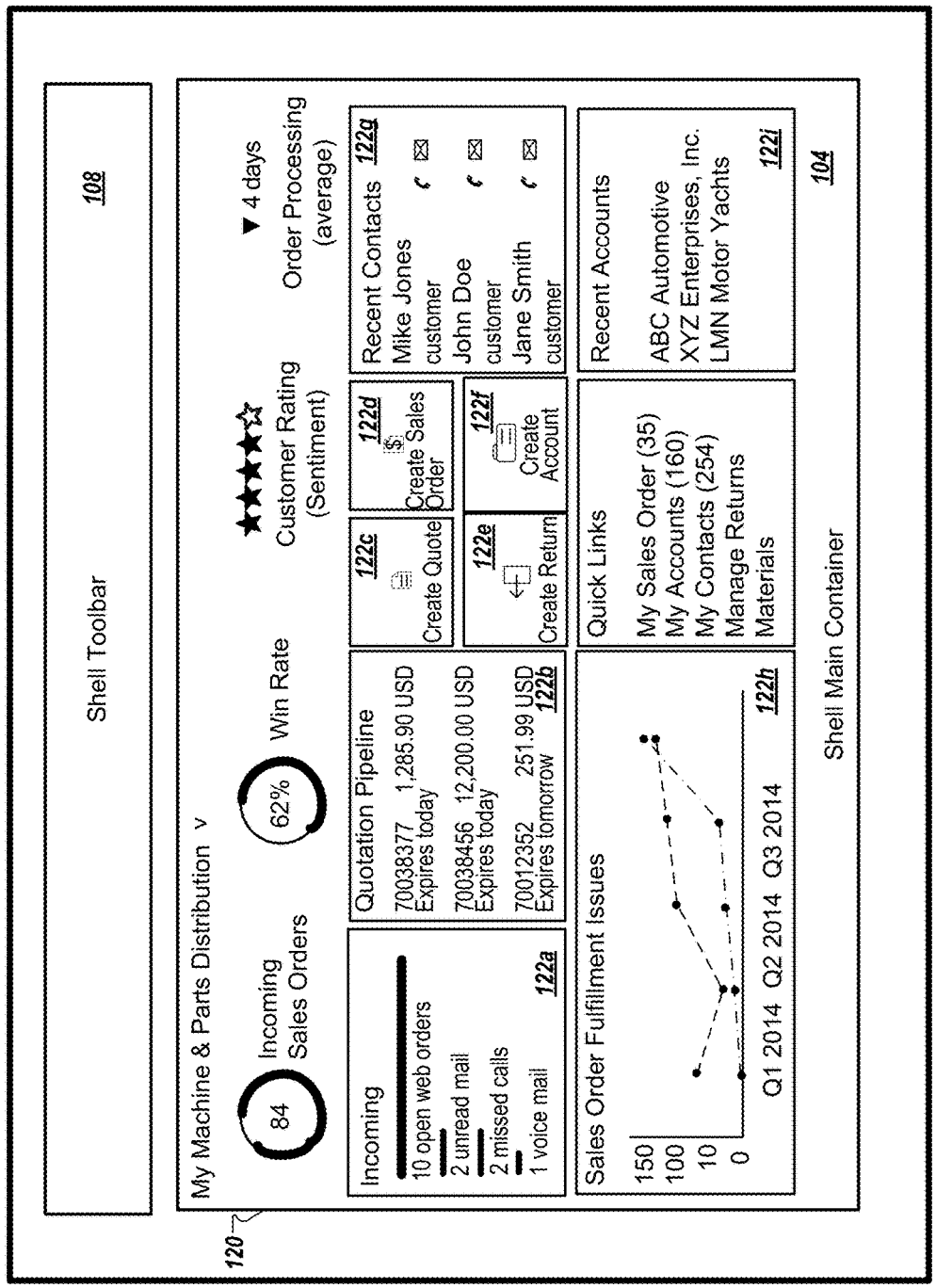
FIG. 1D is an illustration showing an example active application screen (an overview page) displayed in a shell main container.

FIG. 1D is an illustration showing an example active application screen (overview page 120) displayed in the shell main container 104. The enterprise applications that can be accessed by a user by way of the launchpad 112 and then subsequently displayed in an active application screen (e.g., the overview page 120) can include, but are not limited to, transactional applications, analytical applications, and fact sheet applications (contextual navigation applications). Transactional applications can allow a user to create, change and/or approve processes with guided navigation. Analytical applications can provide a user with a visual overview of a dedicated topic for monitoring and tracking purposes to allow for further key performance indicator (KPI) related analysis. Fact sheet applications can allow a user to view essential information about an object and to allow navigation between related objects.

The overview page 120 can visualize all of the information a user may need for a specific business context (business domain) on a single page or screen. The information can be displayed in one or more variable content packages (VCPs) or cards 122a-i. Each card can be a container of content for organizing large amounts of information on an equal plane within the overview page 120. In some implementations, a user can rearrange the position of the cards 122a-i on the overview page 120. In some implementations, a user define, add, or delete cards included in the overview page 120.

An overview page (e.g., the overview page 120) can be a selectable application (e.g., from the launchpad 112) providing an integrated gateway into enterprise applications and application content included in the launchpad 112. The UI of the overview page (e.g., the overview page 120) can provide a user with a visual summary of data, links, actions, and content that are relevant to a business domain of expertise of a user and relevant to a selected role of the user within the domain. The visual summary can be presented in one or more cards (e.g., the cards 122a-i) that display live content to a user at-a-glance without the user having to open multiple applications and perform multiple drill downs through application content to find and present the content.

In some implementations, the overview page 120 can include a footer toolbar (e.g., footer toolbar 132 as shown in FIG. 1F). In some implementations, the footer toolbar can appear to float over the content displayed in the overview page 120.

In some implementations, an enterprise system can determine content displayed on an overview page (e.g., the overview page 120). In addition or in the alternative, a selection of one or more business domains and one or more roles of a user in the business or enterprise can determine content displayed on an overview page (e.g., the overview page 120). In some implementations, a user can make the selection using a settings UI included in a launchpad (e.g., the launchpad 112). In some implementations, a user can select one or more business domains and/or one or more roles of the user in the enterprise by way of an overview page (e.g., the overview page 120). Selecting one or more business domains and/or one or more roles of the user in the enterprise by way of the overview page can maintain absolute relevance to the individual user and the way in which the user works.

In some implementations, the user can personalize the layout and placement of one or more cards (e.g., the cards 122a-i) included in a UI of an overview page (e.g., the overview page 120) and the display of content included in each card. The personalization can enhance the workplace productivity of the user.

Figure 1E:
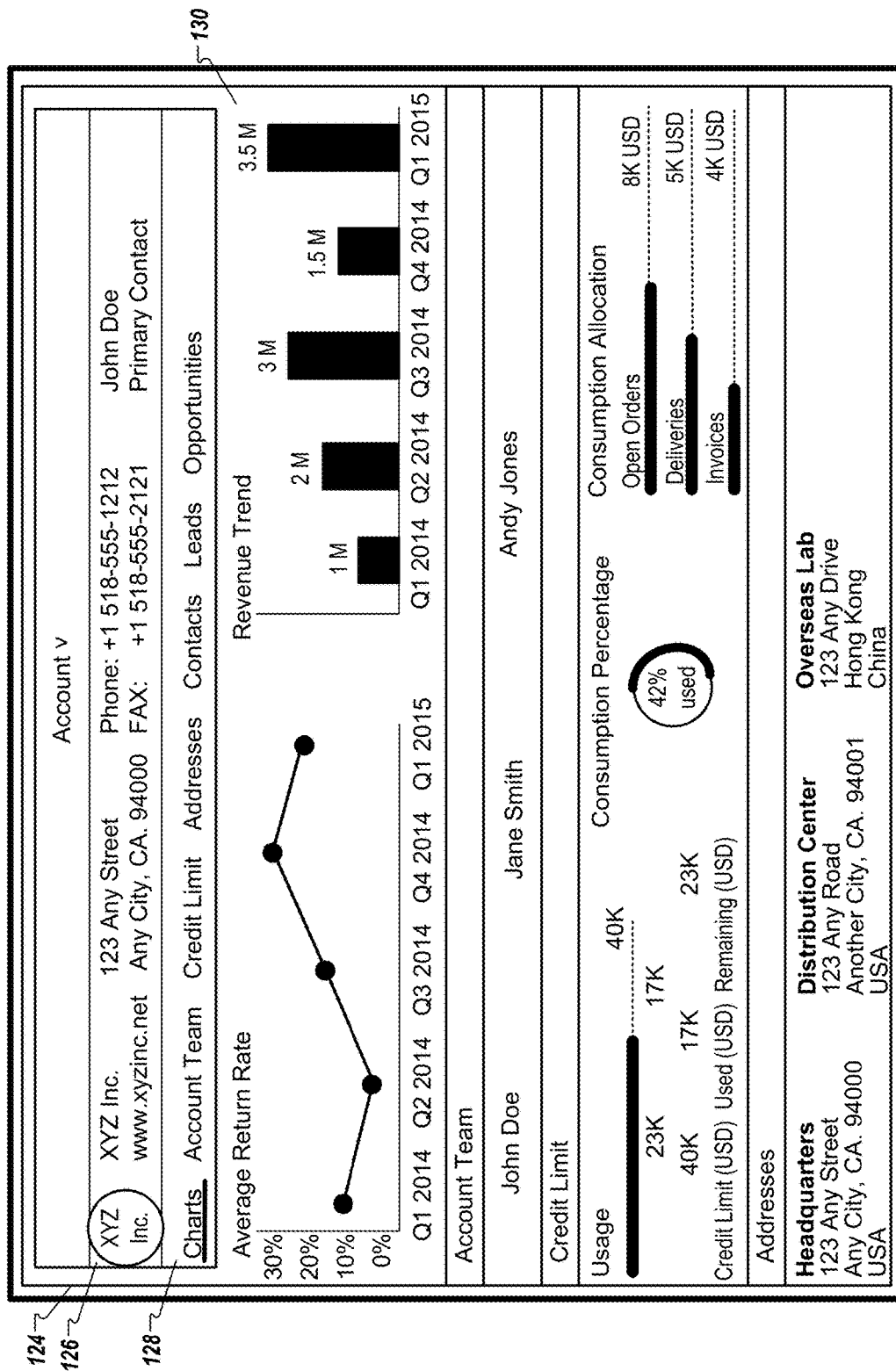
FIG. 1E is an illustration showing an example object page displayed in a shell main container.
Figure 1F:
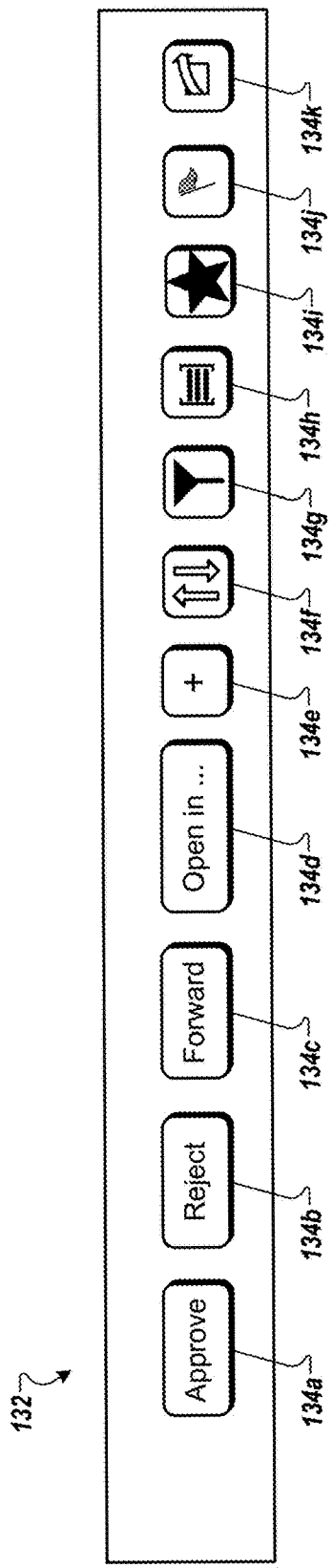
FIG. 1F is an illustration showing an example footer toolbar.

FIG. 1E is an illustration showing an example object page (object page 124) displayed in the shell main container 104. An object page can be a floorplan used to represent objects in a UI. An object page can be used to display, create, or edit an object. An object can represent a business entity (e.g., a customer, a sales order, a product, an account, etc.). Enterprise applications that reflect a specific scenario (e.g., a sales order, am account status) can be bundled using an object. The object page can include a header area 126, a navigation area 128, a content area 130, and, in some implementations, a footer toolbar (e.g., footer toolbar 132 as shown in FIG. 1F). In some implementations, the footer toolbar can appear to float over the content displayed in the object page 124. For example, referring to FIG. 1C, a user can select the tile 114f and an object page can be displayed to the user.

FIG. 1F is an illustration showing an example footer toolbar (e.g., footer toolbar 132). In some implementations, referring to FIG. 1A, the footer toolbar 132 can appear at the bottom of a screen displayed in the shell main container 104, the left container 102, and/or the right container 106. For example, as described herein with reference to FIGS. 1C-E, a footer toolbar (e.g., the footer toolbar 132) can be displayed at the bottom of the launchpad 112, the overview page 120, and the object page 124. The footer toolbar (e.g., the footer toolbar 132) can continue to appear at the bottom of the screen of the display area of the display device even as the displayed screen is scrolled. The footer toolbar (e.g., the footer toolbar 132) can appear to hover over or float over the content being displayed on the screen. The footer toolbar 132 can include buttons or controls 134a-k. The controls 134a-k can be selected by a user in order to perform one or more actions that can impact content included on the page being displayed on the screen. The controls 134a-k are examples of controls that can be included in a footer toolbar. In some implementations, the controls can be different, fewer than, or more that the controls 134a-k. The type and number of controls included in a footer toolbar can be based on the type of page being displayed and/or the content being displayed in the page.

Figure 1G:
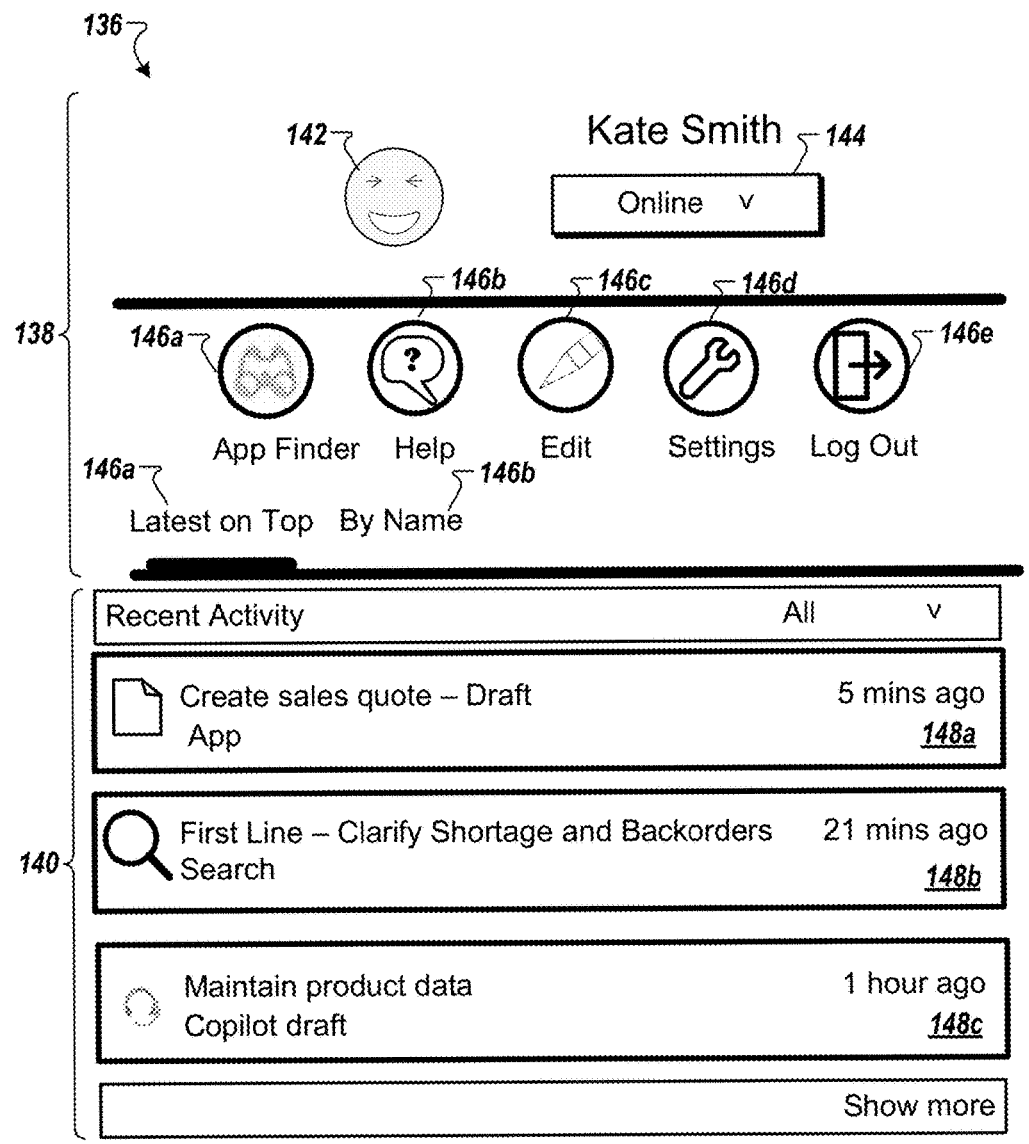
FIG. 1G is an illustration showing an example me area that can be displayed in a left container.

FIG. 1G is an illustration showing an example me area (e.g., me area 136) that can be displayed in the left container 102. In some implementations, the me area 136 can be displayed in the right container 106. The me area 136 includes an upper section 138 and a lower section 140. The upper section 138 includes a user icon 142. Selecting (clicking on) the user icon 142 can provide a user profile. A dropdown indicator button 144 displays a status of the user and, if selected, a user can logout of an application. The upper section 138 includes navigation targets 146a-e. Selection of (clicking on) a navigation target by a user triggers a corresponding functionality (e.g., an application) associated with a navigation target. The me area 136 can provide various generalized functionalities as they are related to a user.

The upper section 138 can include sort selections 146a-b. A user can select (click on) a sort selection (e.g., one of the sort selections 146a-b) to determine how the listing of the recent activities included in the lower section 140 will be sorted and displayed.

The lower section 140 of the me area 136 includes a list of recent activities 148a-c. The recent activities 148a-c can include links 156a-c, respectively, that when selected (clicked on) by a user can navigate the user to back to the shell main container 104, opening an application (or function) that corresponds to the link in the shell main container 104. Recent activity items can include, but are not limited to, enterprise applications, triggered searches, co-pilot collections, and co-pilot drafts.

Figure 1H:
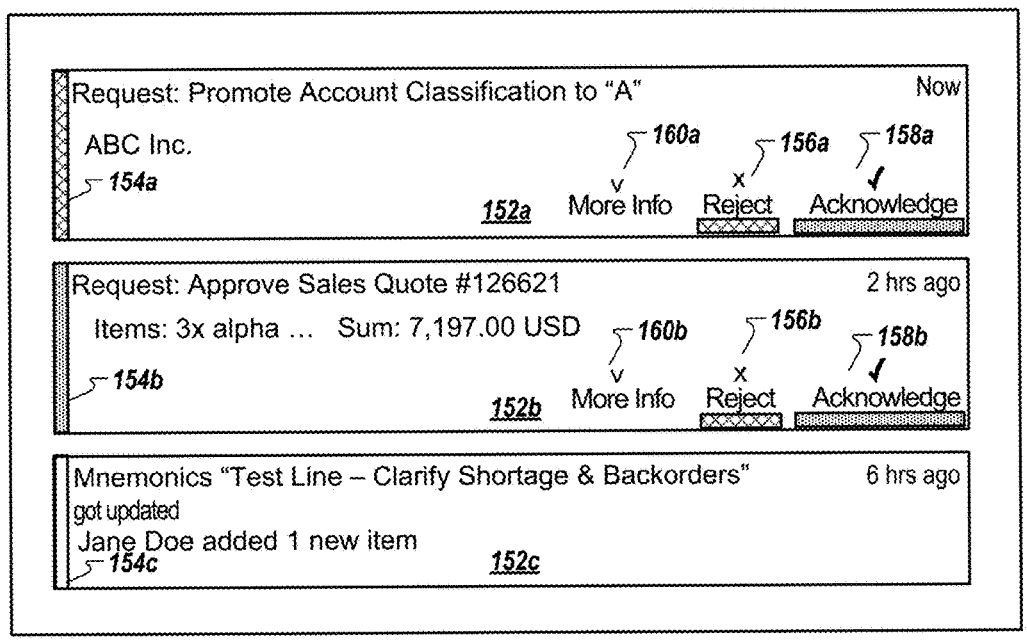
FIG. 1H is an illustration showing an example notification area that can be displayed in a right container.

FIG. 1H is an illustration showing an example notification area (e.g., notification area 150) that can be displayed in the right container 106. In some implementations, the notification area 150 can be displayed in the left container 102. The notification area 150 includes notifications 152 a-c. A user interacting with the UI for the notification area 150 can take immediate action on a notification. A notification item (e.g., notifications 152 a-c) can have an indicator (e.g., notification indicators 154a-c) that can indicate the status of the notification. For example, a notification indicator can be color coded to indicate a particular status of the notification.

A user can reject a notification by selecting (clicking on) a reject selection (e.g., a reject selection 156a-b). For example, a user can reject the notification 152a by selecting (clicking on) the reject selection 156a. The rejection of the notification 152a (the notification status) can be indicated by content included in (e.g., a color of) a notification indicator 154a. A user can acknowledge a notification by selecting (clicking on) an acknowledge selection (e.g., a acknowledge selection 158a-b). For example, a user can acknowledge the notification 152b by selecting (clicking on) the acknowledge selection 158b. The acknowledgement of the notification 152b (the notification status) can be indicated by content included in (e.g., a color of) a notification indicator 154b.

A user can drill down into a relevant application by selecting (clicking on) a more info selection (e.g., a more info selection 160a-b). In some cases, a user may contact someone directly in response to a notification.

Figure 1I:
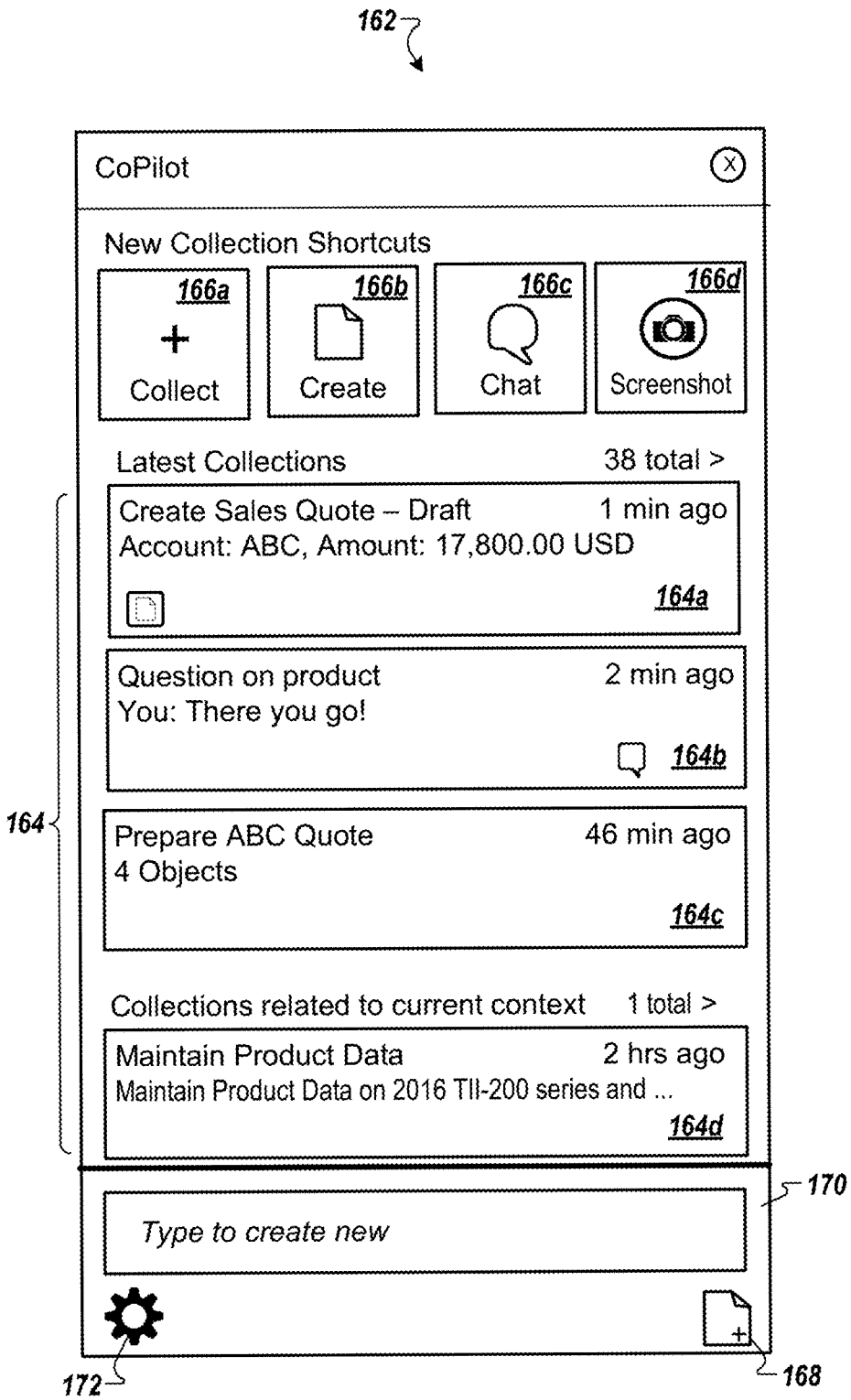
FIG. 1I is an illustration showing an example copilot user interface.

FIG. 1I is an illustration showing an example copilot UI (e.g., copilot UI 162). For example, referring to FIG. 1C, a copilot application can be launched from the launchpad 112 when a user selects (clicks on) the copilot launch icon 113. The copilot application can provide (generate and display) the copilot UI 162. In some cases, the copilot UI 162 can float over the UI included in the launchpad 112. As a floating UI control, the copilot UI 162 can be visually unobtrusive and flexible in its cross-functional omnipresent implementation across any device or application screen.

The example copilot UI 162 is an example copilot start page or start screen. The start screen (the copilot UI 162) can be an entry point for copilot functionality for an enterprise system.

The copilot UI 162 can provide shortcuts to different copilot features. For example, as shown in FIG. 1I, a collection can be represented by an entry in a collection list 164 that includes collection list entries 164a-d. A copilot collection can be a cluster of items in relation to a specific topic. For example, an item can be a note, a screenshot, a chat message, a copilot message, an object, or a quick create. In some implementations, the items included in the collection can be homogeneous (e.g., all of the items are of the same type). In some implementations, the items included in a collection can be non-homogeneous (e.g., the items can be of different types). Each collection list entry 164*a-d* can provide a representation of a collection that can include a title, a timestamp (e.g., last changed), a visual content summary, and a textual content preview. In some implementations, the collection list 164 can be searched and/or filtered.

For example, the selection of a copilot shortcut 166*a-d* can allow a user to create and navigate to a new collection with a specified intention. The selection of a copilot create icon 168 located in a copilot footer toolbar 170 can create and navigate to a new plain collection. The selection of a copilot settings icon 172 located in the copilot footer toolbar 170 can allow a user access to copilot settings (e.g., display a copilot settings UI, open a copilot settings application).

Copilot entries can be living, gradually growing artifacts and software entities that can accompany a user from the identification of an issue to a solution for the issue, while providing support in the form of relevant context and actions. Copilot entries can serve as memory aides while the copilot entries can incrementally evolve into valuable transactional tasks and collaborations as they mature in meaningful ways that bridge a gap between predefined application functionality and processes based on personal way of working for a user. Though the example shown in FIG. 1I describes launching the copilot application from the launchpad 112, referring to FIG. 1A, the copilot application can be launched from other screens displayed in (included in) the shell main container 104, the left container 102, and/or the right container 106.

Copilot entries can be made ready for users to use when communicating, collaborating, and creating actionable transactions in desktop or mobile scenarios. For example, copilot text entries can be analyzed for recognizing and identifying relevant text related objects. Copilot text entries can emphasize displayed text, and a copilot application can recommend contextual entities for use in a current task. The copilot application can understand user context and can intelligently propose selections, auto-entries, and user options.

A smart template can provide a framework for generating user interfaces (UI) at runtime for an enterprise application. For example, a smart template can be used to generate the UI for the overview page 120 as shown in FIG. 1D. For example, a smart template can be used to generate the UI for the object page 124 as shown in FIG. 1E. A smart template can provide a framework for generating the user interfaces based on metadata annotations and predefined templates for the most used application patterns. The use of smart templates can ensure design consistency by providing centralized high quality code that uses predefined templates and controllers. The use of smart templates can keep applications up to date with evolving design guidelines. The use of smart templates can reduce an amount of front-end code for building enterprise applications. The term "smart" can refer to annotations that add semantics and structures to provided data. The term "smart" can also refer to the way in which the templates understand the semantics. A goal for the use of smart templates is to ensure UI consistency along with increasing the efficiency of UI development.

Figure 1J:
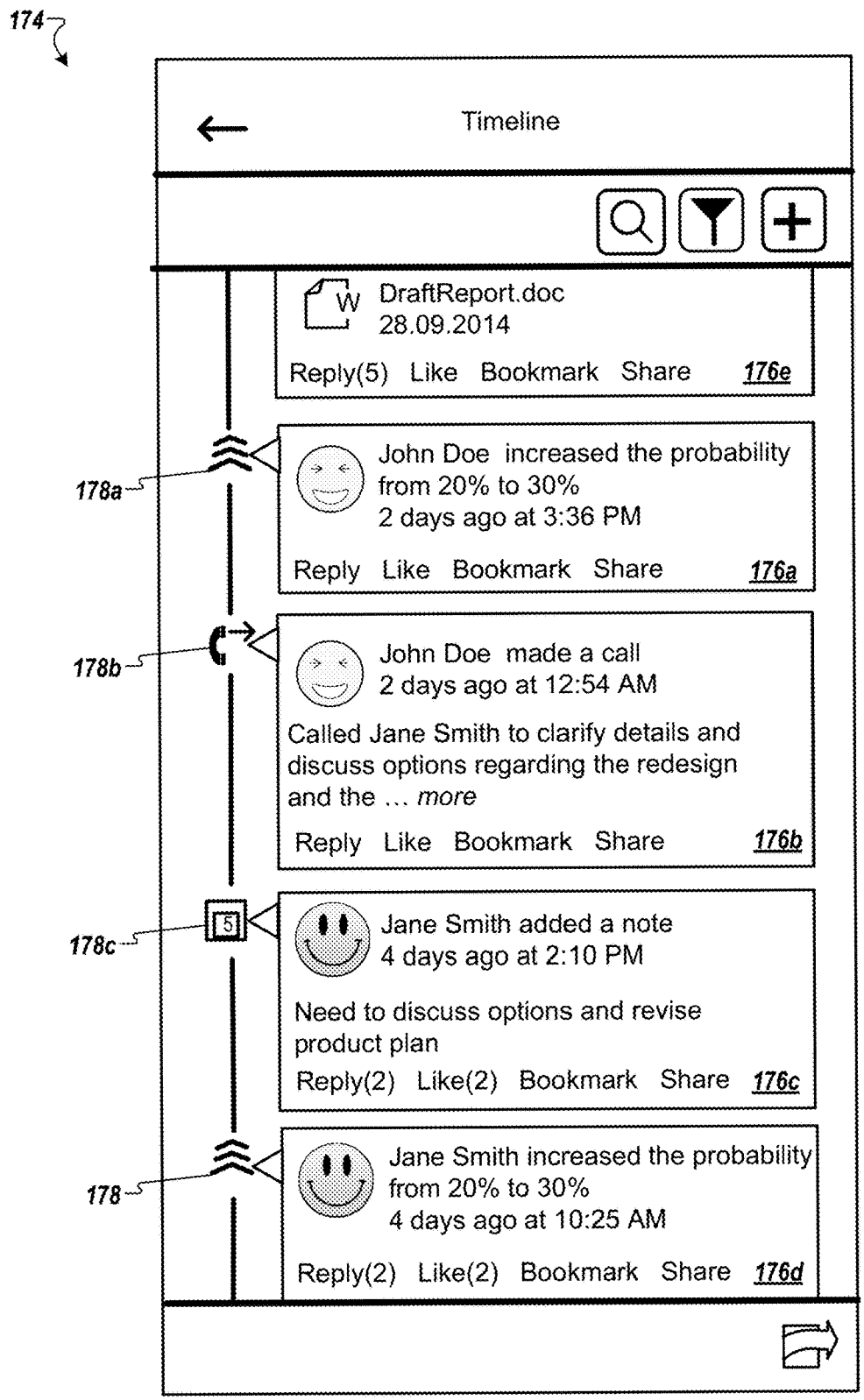
FIG. 1J is an illustration of a timeline user interface that can display timeline entries.

FIG. 1J is an illustration of a timeline UI (e.g., the timeline 174). A timeline UI (e.g., the timeline 174) can display timeline entries 176*a-e*. For example, the entries can be events, objects, and/or posts listed and displayed in a chronological order. The timeline 174 includes nodes 178*a-d* that correspond to respective timeline entries 176*a-d*.

The timeline 174 can be used for collaborative communications. The timeline 174 can be configured in multiple different ways depending on use case implementations. For example, the timeline 174 can provide information about changes of an object or about events related to an object. The timeline 174 can provide information about generated entries (e.g., value XY changed from A to B) or about manual entries (e.g., comments from an individual). In some implementations, the latest entry is at the top of a list displayed by a timeline. In some implementations, the timeline 174 can be displayed along with a business object. In some cases, the timeline 174 can be displayed to the right of the business object.

Two versions of a timeline can include a basic timeline and a social timeline. A basic timeline can be a read-only timeline. A social timeline can allow for interaction and collaboration among users.

Figure 2:
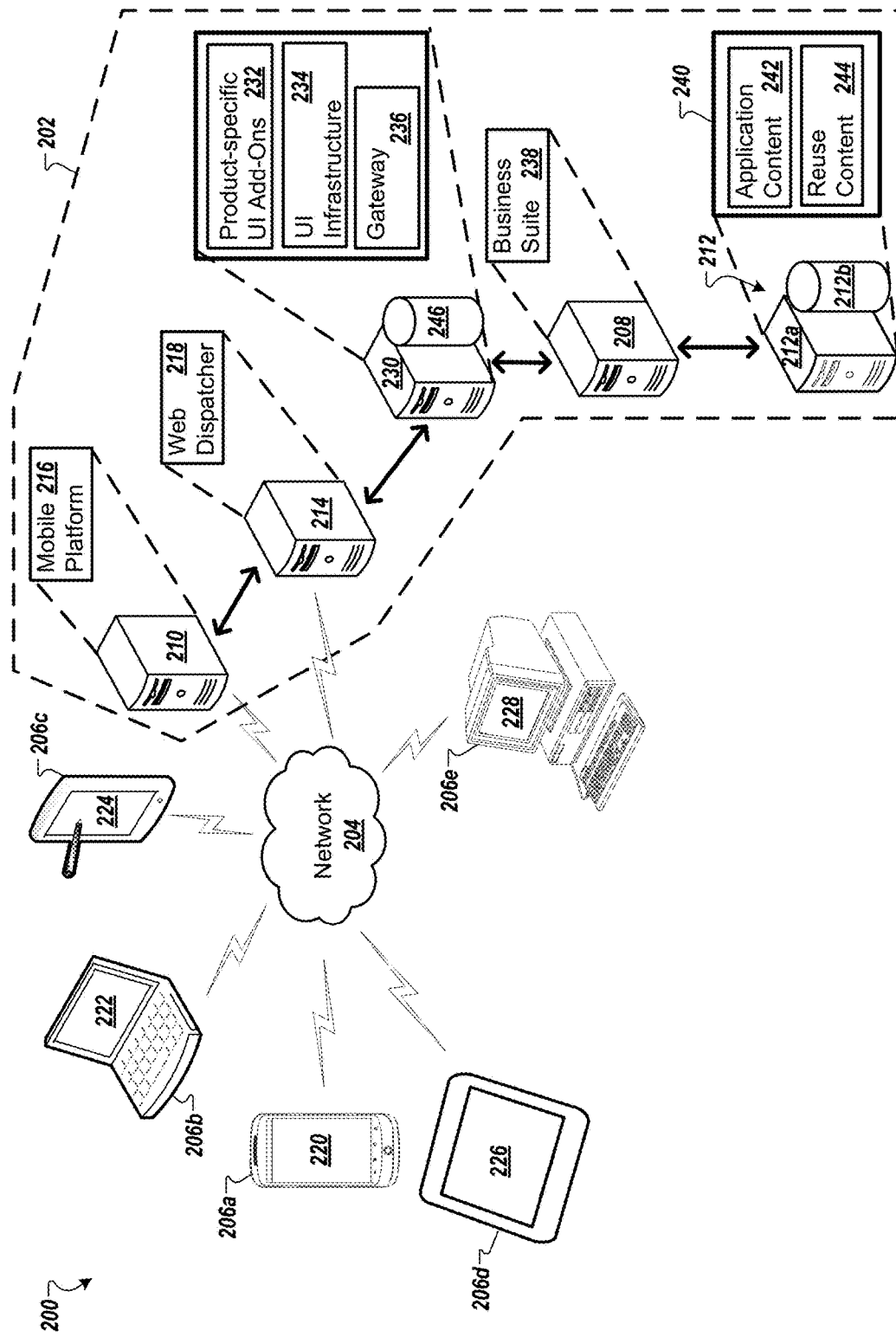
FIG. 2 is a diagram of an example system that can implement the user interfaces and user experiences described herein.

FIG. 2 is a diagram of an example system 200 that can implement the user interfaces and user experiences described herein. The system 200 includes an enterprise computing system 202, a network 204, and client computing devices 206*a-e*.

For example, computing device 206*a* can be a mobile phone, a smartphone, a personal digital assistant, or other type of mobile computing device. The computing device 206*a* includes a display device 220. For example, computing device 206*b* can be a laptop or notebook computer. The computing device 206*b* includes a display device 222. For example, computing device 206*c* can be a tablet computer. The computing device 206*c* includes a display device 224. For example, the computing device 206*d* can be a wearable device such as a smartwatch. The computing device 206*d* includes a display device 226. For example, the computing device 206*e* can be a desktop computer. The computing device 206*e* can include a display device 228. A user of the computing devices 206*a-e* can use/interface with the display devices 220, 222, 224, 226, and 228, respectively, when interacting with the enterprise computing system 202. The computing devices 206*a-e* can display on the display devices 220, 222, 224, 226, and 228 any of the screens and UIs described herein.

The enterprise computing system 202 can include one or more computing devices such as a web management server 214, a frontend server 230, a backend server 208, and a mobile device management server 210. The enterprise computing system 202 can also include a database management computing system 212 that includes a database management server 212*a* and a database 212*b*. Though not specifically shown in FIG. 2, each server (the web management server 214, the frontend server 230, the backend server 208, the mobile device management server 210, and the database management server 212*a*) can include one or more processors and one or more memory devices. Each server can run (execute) a server operating system.

In some first implementations, the client computing devices 206*a-d* (e.g., the mobile computing devices) can communicate with the enterprise computing system 202 (and the enterprise computing system 202 can communicate with the client computing devices 206*a-d*) by way of the mobile device management server 210. The mobile device management server 210 includes one or more mobile device platform application(s) 216. By using the mobile device platform application(s) 216, the enterprise computing system 202 can deliver cross-platform, secure, and scalable applications to the computing devices 202*a-d*, independent of the mobile computing device-type (e.g., laptop, notebook, smartwatch, mobile phone, PDA, etc.) and independent of the operating system running on the computing device 206*a-d*. In these implementations, the mobile device management server 210 can then communicate with the web management server 214.

In some second implementations, the client computing devices 206*a-e* (both the mobile computing devices (computing devices 206*a-d*) and the desktop computing device 206*e*) can communicate with the enterprise computing system 202 (and specifically with the web management server 214), and the enterprise computing system 202 (and specifically with the web management server 214) can communicate with each of the client computing devices 202*a-e*) using the network 204. The web management server 214 includes a web dispatcher application 218. In both the first implementations and the second implementations, the web dispatcher application 218 can act as a "software web switch" accepting or rejecting connections to the enterprise computing system 202.

In some implementations, the network 204 can be a public communications network (e.g., the Internet, cellular data network, dialup modems over a telephone network) or a private communications network (e.g., private LAN, leased lines). In some implementations, the computing devices 206*a-e* can communicate with the network 204 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The frontend server 230 can include product specific UI Add-On Applications 232 and a UI infrastructure 234. The UI infrastructure 234 can include a design portion and a runtime portion. The frontend server 230 can decouple a lifecycle of a UI (e.g., design and runtime deployment) from the backend server 208. The decoupling can allow UI applications to interface with a plurality of different databases. The decoupling provides a single point of UI design, access, and maintenance allowing for theming, branding, configuring, and personalizing a UI without a need for development privileges to the backend server 208 (e.g., no need to have backend administrative rights). The decoupling can result in a more secure enterprise computing system. The decoupling can provide for rule-based dispatching of requests in a multi-system landscape (e.g., for approvals including aggregation).

The frontend server 230 includes a gateway 236. The gateway 236 can provide a way to connect devices, environments, and platforms to enterprise software based on market standards. The gateway 236 can enable the development of UIs for use in different environments (e.g., social and collaboration environments). The gateway 236 can enable the development of UIs for use on different types of client computing devices (e.g., client computing devices 206*a-e*). The gateway 236 can enable the development of UIs for use in internet-based applications.

The front end server 230 can access one more databases or repositories (e.g., database 246). The database 246 can include (store) smart templates for use in creating UIs for an enterprise application at runtime, The The backend server 208 can include a bundle (a set) of business applications (e.g., business suite 238). The business applications can be transactional applications. analytical applications, and fact sheet and contextual navigation applications. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

The database management computing system 212 includes a database management server 212*a* that can run (execute) applications that can manage a database 212*b*. For example, the database 212*b* can be an in-memory, column-oriented, relational database (e.g., SAP HANA®). The database management computing system 212 can include extended application services 240 that can embed a full featured application server, web server, and development environment within the database management computing system 212. The extended application services 240 can include application content 242 and reuse content 244 for use by the enterprise computing system 202 when providing a personalized, responsive, and simple UX across different types of computing devices and deployment options.

Smart templates can provide a configurable set of predefined building blocks that can be referred to as user interface (UI) floorplans. The UI floorplans can provide a framework for generating user interfaces at runtime by applying a metadata driven approach to user interface design and development for an enterprise application. The use of UI floorplans can reduce an amount of frontend code needed for building applications that include user interfaces. Smart templates can foster user interface design consistency within an enterprise application. Because the UI floorplans included in the smart templates can provide a framework for generating user interfaces at runtime, the user interfaces included in an enterprise application can be updated with evolving user interface design guidelines.

A smart template facility can reside or operate within a user interface on any type of target computing device (e.g., computing devices 206*a-e*). A smart template facility can dynamically adjust or adapt aspects of a smart template to account for particulars (e.g., hardware and/or software (e.g., operating system)) of a target computing device (e.g., display real estate, display size, display resolution, input mechanism(s), input devices (e.g., keyboard, mouse, microphone, touchpad, trackpad), output devices (e.g., speakers)).

Figure 3:
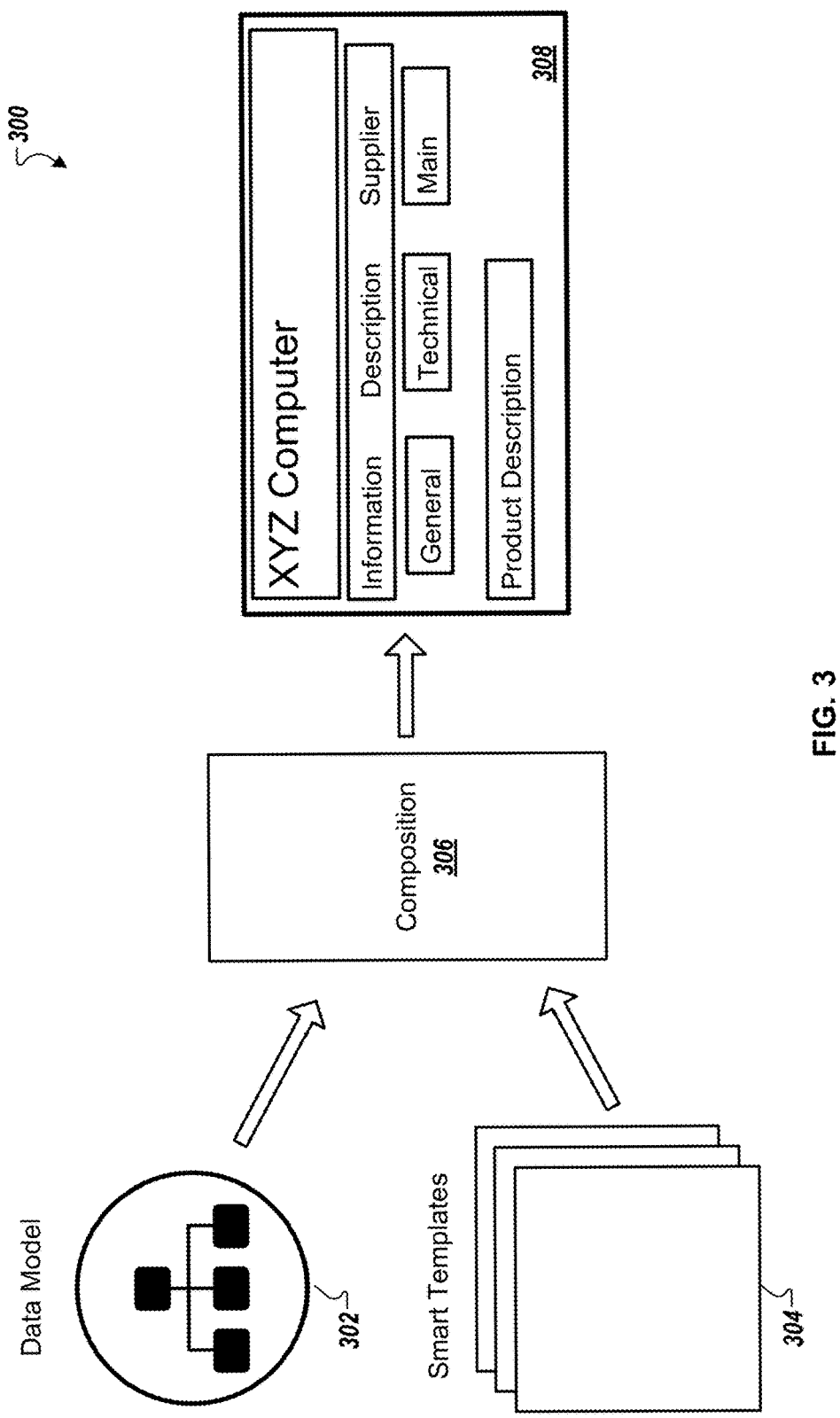
FIG. 3 is a block diagram illustrating an example general aspect of incorporating smart templates in an enterprise application.

FIG. 3 is a block diagram illustrating an example general aspect 300 of incorporating smart templates in an enterprise application. For example, a team of software developers (e.g., backend developer(s), UI developer(s), and template developer(s)) can create a data model 302 and smart templates 304. In addition, a team of designers can also assist in the creation of the smart templates 304. The data model 302 can define the semantics of the data for use by the enterprise application. The semantics for the data can include, but is not limited to, data types, information structure, and relations. The smart templates 304 can be created for commonly used page types, layouts, and compositions for the enterprise application. A UI developer can compose (composition 306) a UI 308 for the enterprise application by combining the smart templates 304 with the data using the data model 302. In addition, the developer can fine tune the UI to include configuration and freestyle development where needed. For example, a UI can be based on a smart template and can include one or more template items as well as user customizable additional aspects of the UI (e.g., freestyle development elements). For examples, referring to FIG. 2, the smart templates 304 and the data model 302 can be included (stored) in the database 246 for use by the frontend server 230 when a UI is composed. The data model 302 can be applied to data included in the database 212b.

FIGS. 4A-H show block diagrams illustrating development steps for user interface design and development for an enterprise application using smart templates. The UI design and development for the enterprise application can be included in an enterprise web integrated development environment (IDE). The enterprise web IDE can execute (run) in a web browser application executing (running) on a computing device of a developer. The enterprise web IDE can be considered a wizard for creating a new project that can incorporate smart template(s). The computing devices can be, for example referring to FIG. 2, one or more of the computing devices 206a-e. The computing devices 206a-e can communicate with the frontend server 230 using the network 204. The UI infrastructure 234 can include a design portion and a runtime portion. Referring to FIGS. 2 and 3, the frontend server 230 can decouple the design and runtime deployment from the backend server 208 allowing UI applications to interface with a plurality of different databases that can include data used by a data model (e.g., the data model 302) when composing the UI using smart templates (e.g., the smart templates 304).

Figure 4A:
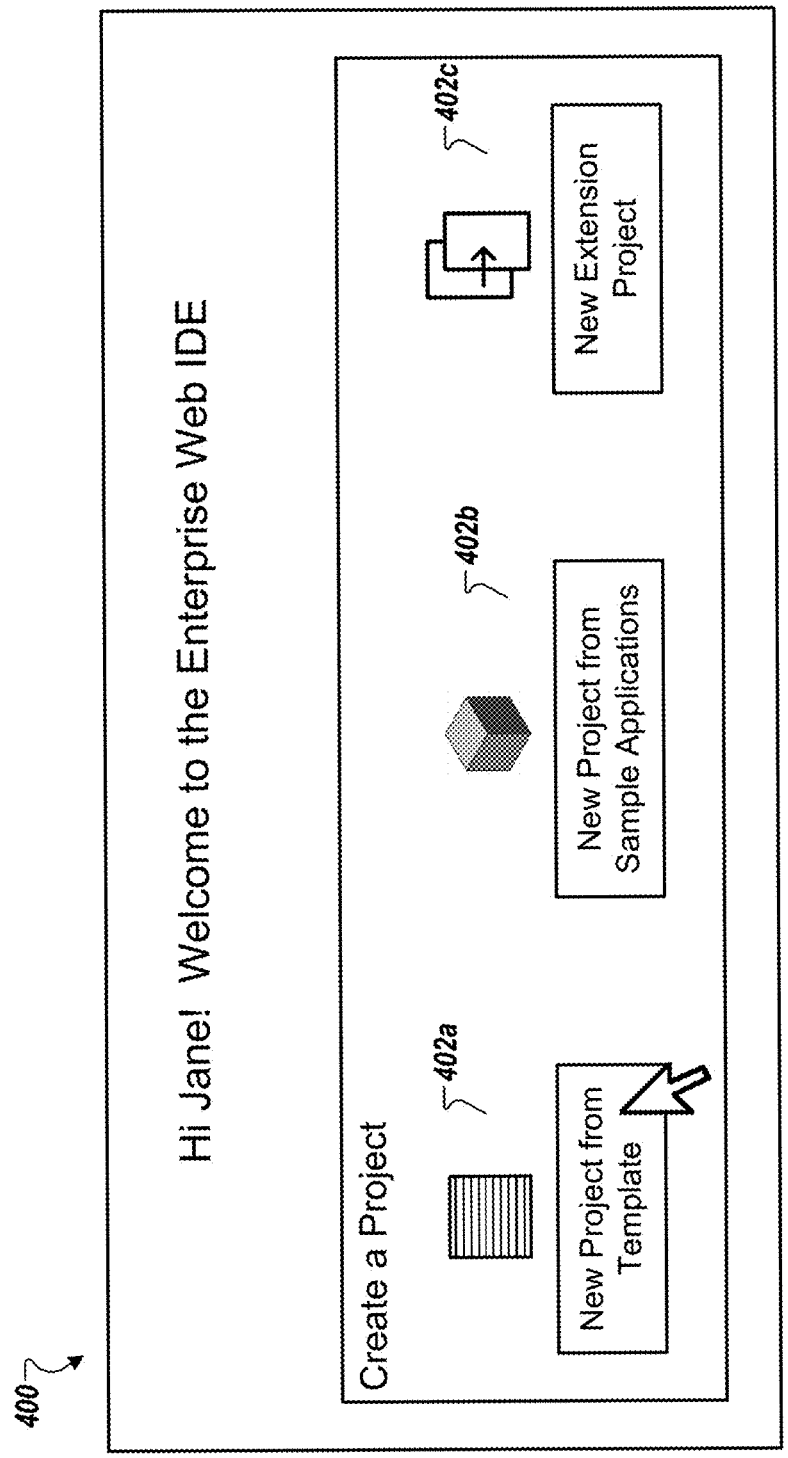
FIG. 4A illustrates example projects for use in creating and generating an enterprise application.

FIG. 4A illustrates example projects 402a-c for use in creating and generating an enterprise application. An example first step 400 in the creation of the enterprise application that uses smart templates is the selection of a new project from a template (project 402a). For example, a developer interfacing with the enterprise web IDE can select (e.g., point to and click on) the project 402a. Smart templates can incorporate the latest design and UX building blocks of a UI for the enterprise application. Smart Templates can provide the most used application patterns. A smart template can provide a framework for generating a fully functional UI for the enterprise application at runtime (e.g., example UI 306 as shown in FIG. 3C).

Figure 4B:
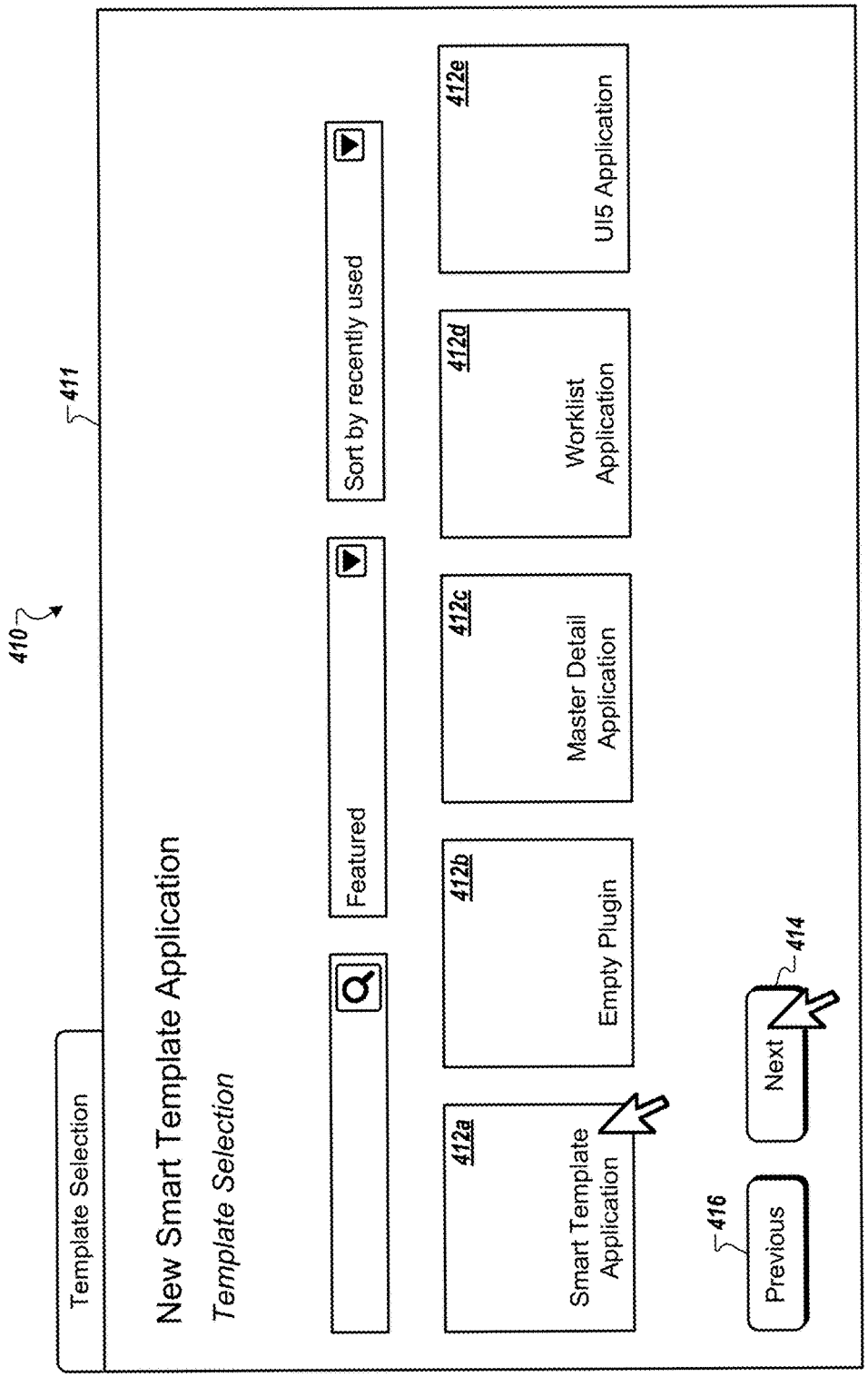
FIG. 4B illustrates example template applications for use in creating and generating an enterprise application.

FIG. 4B illustrates example template applications 412a-e for use in creating and generating an enterprise application. The template applications 412a-e can be shown in a template selection tab (web page) 411 of the enterprise web IDE executing in the web browser. An example second step 410 in the creation of the enterprise application that uses smart templates is the selection of the smart template application 412a. The template applications 412a-e can incorporate the latest enterprise application design and UX. The selection of a template application can create an enterprise application that is based on one or more predefined template views and controllers. The one or more predefined template views and controllers can use Open Data Protocol (OData) services and annotated files. The use of OData services can allow for the execution of enterprise applications in a scalable and cost-effective manner in a cloud computing environment (e.g., the example system 200) by following protocols defined in the OData services. In general, smart templates can use (interface with) OData services to build user interfaces (UIs) for a simplified user experience (UX) across digital assets defined in applications and interfaces across multiple platforms (e.g., UI technologies such as HTML5/SAP.UI5, WebDynPro, WebGUI, and SAPGUI, etc.).

Once a template application is selected, a next button 414 can be selected in order to proceed to the next step in the creation of the enterprise application that uses smart templates. In some cases, a previous button 416 can be selected in order to return to a previous step (e.g., the example first step 400 as shown in FIG. 4A).

FIG. 4C illustrates example information for use in creating and generating an enterprise application. The information can be shown in a basic information tab (web page) 421 of the enterprise web IDE executing in the web browser. An example third step 420 in the creation of the enterprise application that uses smart templates is the entering of basic information and application descriptor data (app descriptor data 422a-f) for use by the smart template application. For example, a project name can be entered in a project name data entry field 428. The app descriptor data can provide a central, machine readable, and easily accessible location in a database for storing metadata associated with an application or an application component. The app descriptor data can include, but is not limited to, application specific attributes, UI specific attributes, and platform specific attributes. For example, the metadata can include, but is not limited to, the app descriptor data as entered in app descriptor data entry fields 422a-f as shown in FIG. 4C. The app descriptor data entry fields 422a-f can include, but are not limited to, a title field 422a, a namespace field 422b, a description field 422c, an application component hierarchy field 422d, an enterprise application identifier (ID) field 422e, and a development path field 422f.

Once the basic information is entered, a next button 424 can be selected in order to proceed to the next step in the creation of the enterprise application that uses smart templates. In some cases, a previous button 426 can be selected in order to return to a previous step (e.g., the example second step 410 as shown in FIG. 4B).

Figure 4D:
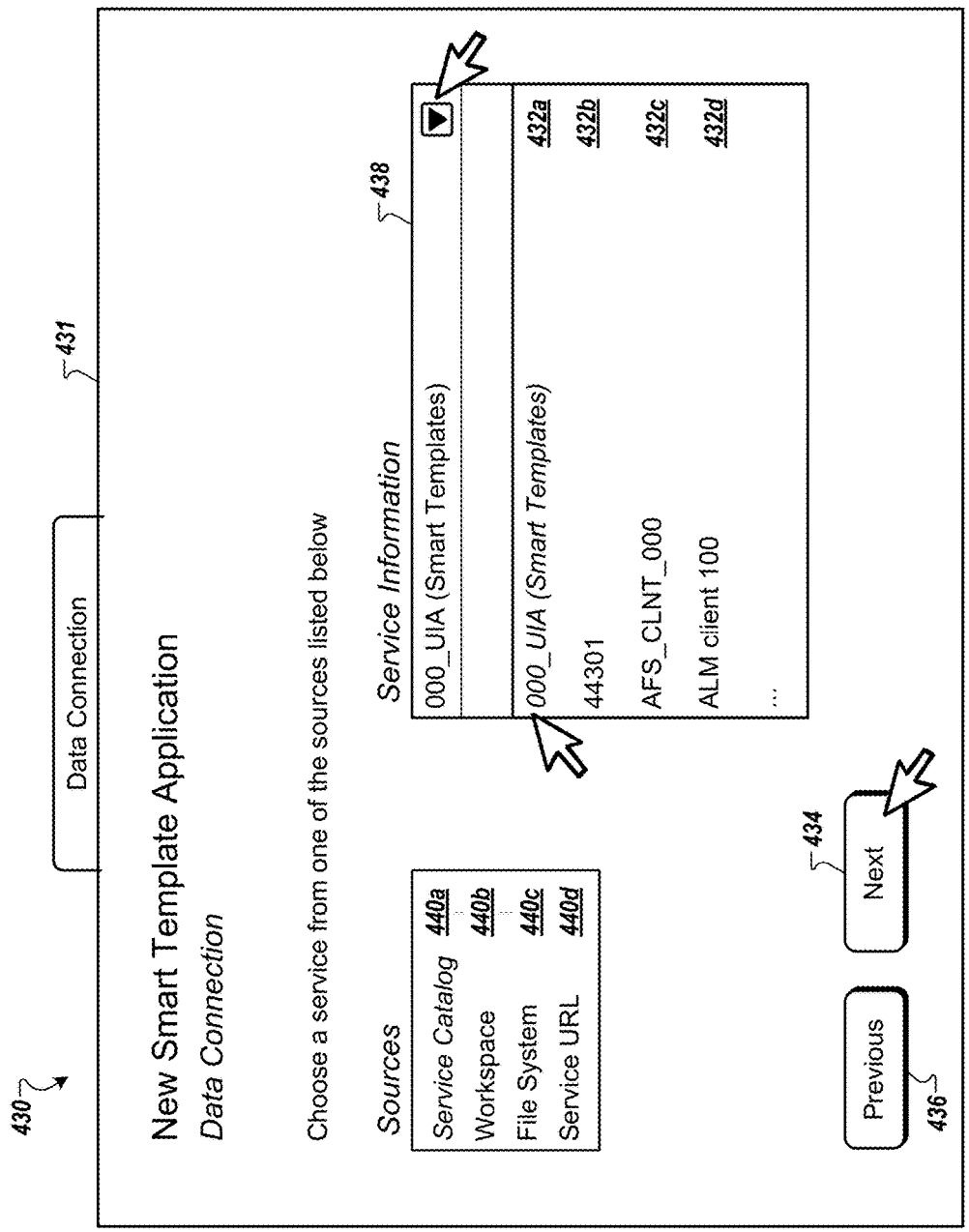
FIG. 4D illustrates example data connection information that includes example annotated OData sources and example core data services for selection when creating and generating an enterprise application.

FIG. 4D illustrates example data connection information that includes example annotated OData sources 440a-d and example core data services (CDS) 432a-d for selection when creating and generating an enterprise application. The example core data services (CDS) 432a-d can be shown for selection in a data connection tab (web page) 431 of the enterprise web IDE executing in the web browser. An example fourth step 430 in the creation of the enterprise application that uses smart templates is the selecting of a 000_UIA (Smart Templates) CDS 432c. As shown in FIG. 4D, the 000_UIA (Smart Templates) CDS 432c can be selected from the drop-down menu of services (e.g., service information 438). For example, the services listed in the drop-down menu of services can be based on the annotated OData sources.

Once the data connection information is entered, a next button 434 can be selected in order to proceed to the next step in the creation of the enterprise application that uses smart templates. In some cases, a previous button 436 can be selected in order to return to a previous step (e.g., the example third step 420 as shown in FIG. 4C).

Figure 4E:
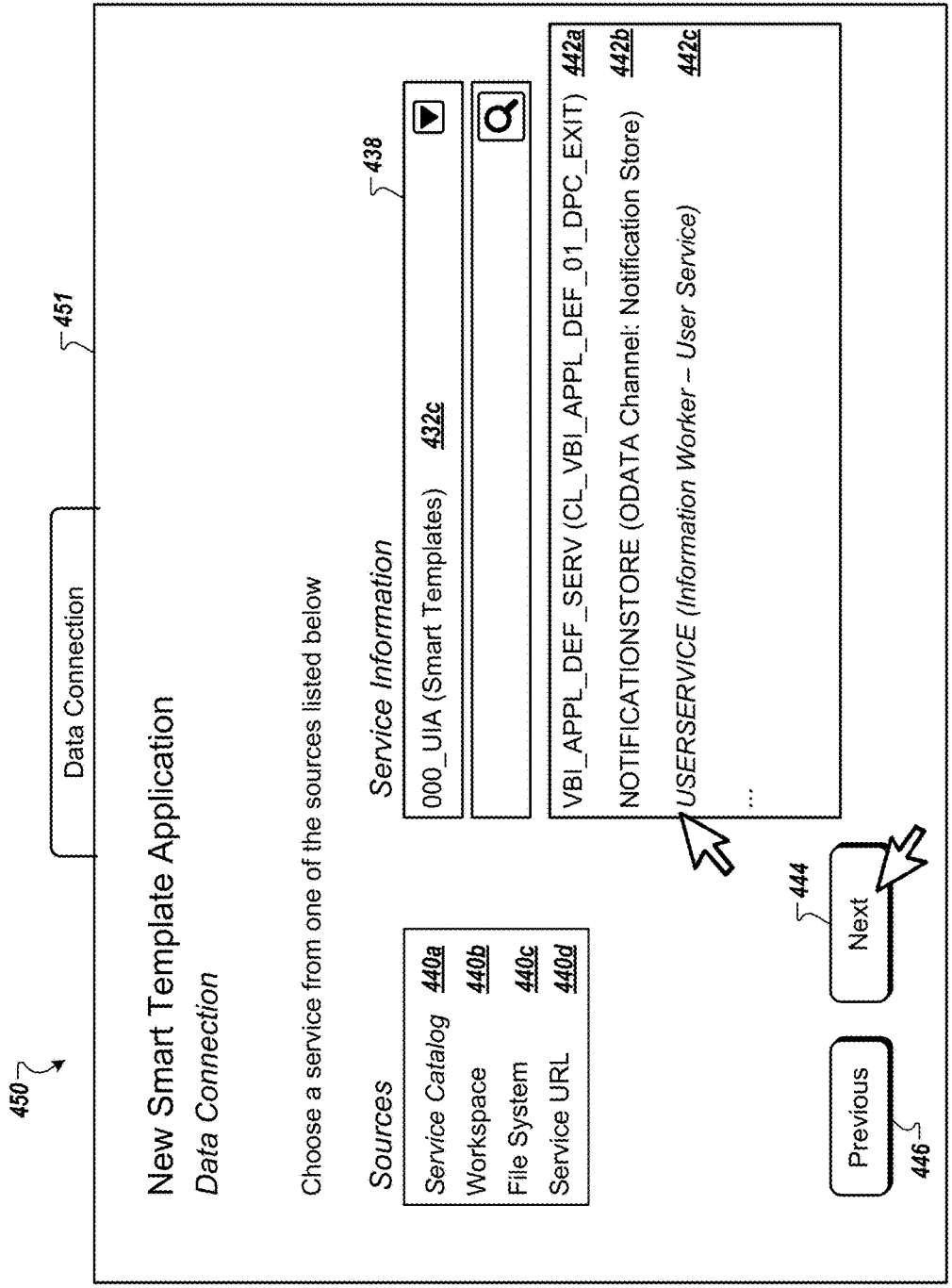
FIG. 4E illustrates example data connection information that includes example OData services for selection when creating and generating an enterprise application that uses the selected core data service.

FIG. 4E illustrates example data connection information that includes example OData services 442a-c for selection when creating and generating an enterprise application that uses the selected 000_UIA (Smart Templates) CDS 432c. For example, the example OData services 442a-c can be specific OData services included in the 000_UIA (Smart Templates) CDS 432c. The example OData services 442a-c can be shown for selection in a data connection tab (web page) 451 of the enterprise web IDE executing in the web browser. An example fifth step 450 in the creation of the enterprise application that uses smart templates is the selecting of an OData service (e.g., the OData service 442c) for use with a core data service (e.g., core data service 432a).

Once the data connection information is entered, a next button 444 can be selected in order to proceed to the next step in the creation of the enterprise application that uses smart templates. In some cases, a previous button 446 can be selected in order to return to a previous step (e.g., the example fourth step 430 as shown in FIG. 4D).

Figure 4F:
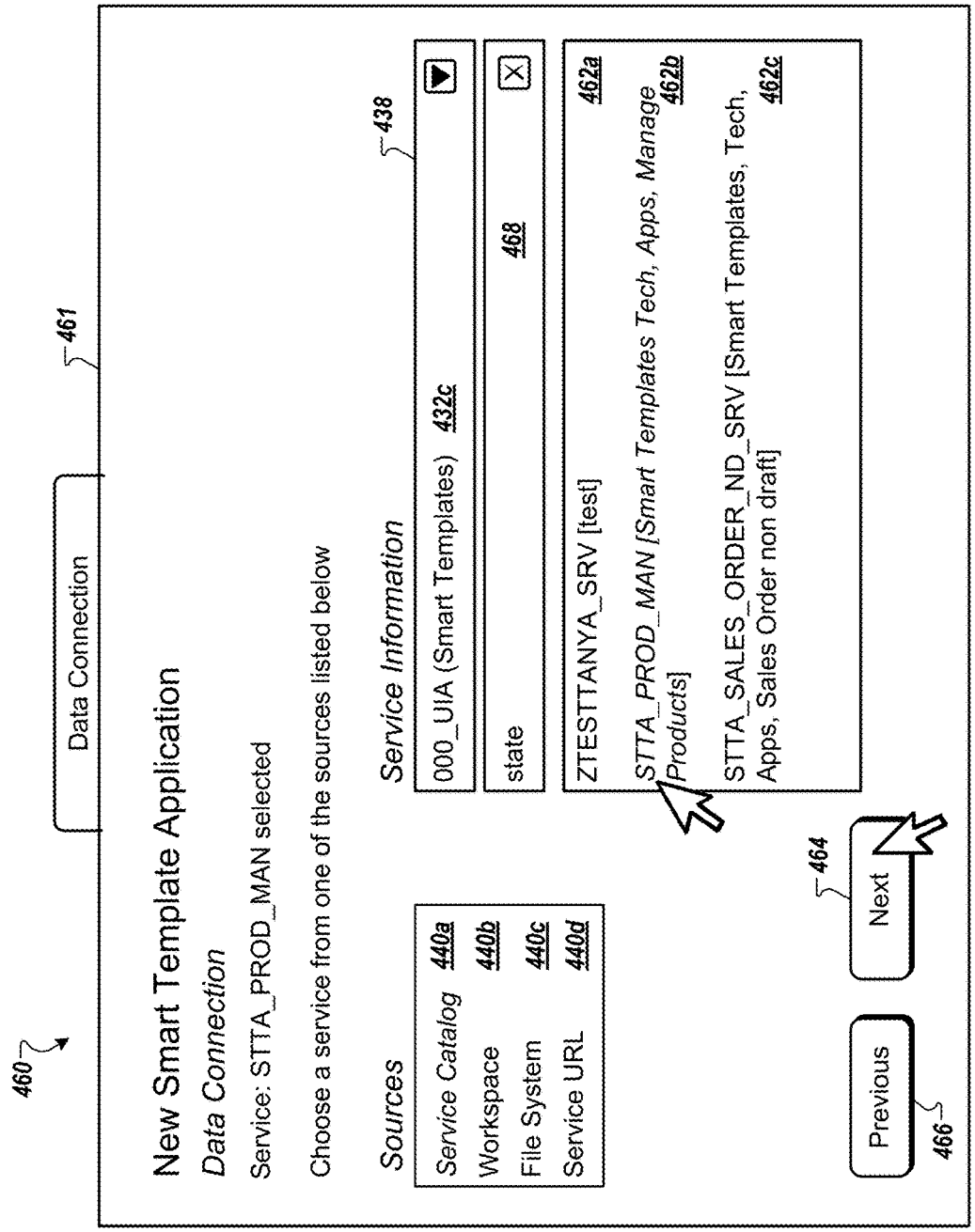
FIG. 4F illustrates example data connection information that includes example annotated OData services for selection when creating and generating an enterprise application that uses the selected core data service and a selected state OData service.

FIG. 4F illustrates example data connection information that includes example annotated OData services 462a-c for selection when creating and generating an enterprise application that uses the selected 000_UIA (Smart Templates) CDS 432c and a selected state OData service 468. For example, the example annotated OData services 462a-c can be specific annotated OData services included in the state OData service 468 for the 000_UIA (Smart Templates) CDS 432c. The example annotated OData services 462a-c can be shown for selection in a data connection tab (web page) 461 of the enterprise web IDE executing in the web browser. An example sixth step 460 in the creation of the enterprise application that uses smart templates is the selecting of an annotated OData service (e.g., the annotated OData service 462b) for use with an OData service (e.g., the state OData service 468) for a core data service (e.g., core data service 432a).

Once the data connection information is entered, a next button 464 can be selected in order to proceed to the next step in the creation of the enterprise application that uses smart templates. In some cases, a previous button 466 can be selected in order to return to a previous step (e.g., the example fifth step 450 as shown in FIG. 4e).

FIG. 4G illustrates example annotated files 472a-b for use when creating and generating an enterprise application. The example annotated files 442a-b are shown in an annotation selection tab (web page) 471 of the enterprise web IDE executing in the web browser. An example seventh step 470 in the creation of the enterprise application that uses smart templates is the adding and ranking of annotated files (e.g., the annotated files 472a-b). The annotation files 472a-b are selected and then ranked in an order in which they will be loaded by the smart template application. In some cases, if the annotation files 472a-b overlap, the annotation file last loaded will overwrite any previously loaded annotation files. A selected service (e.g., as shown in FIG. 4F) can include annotated data.

Once the annotation selection information is entered, a next button 474 can be selected in order to proceed to the next step in the creation of the enterprise application that uses smart templates. In some cases, a previous button 476 can be selected in order to return to a previous step (e.g., the example sixth step 460 as shown in FIG. 4F).

Figure 4H:
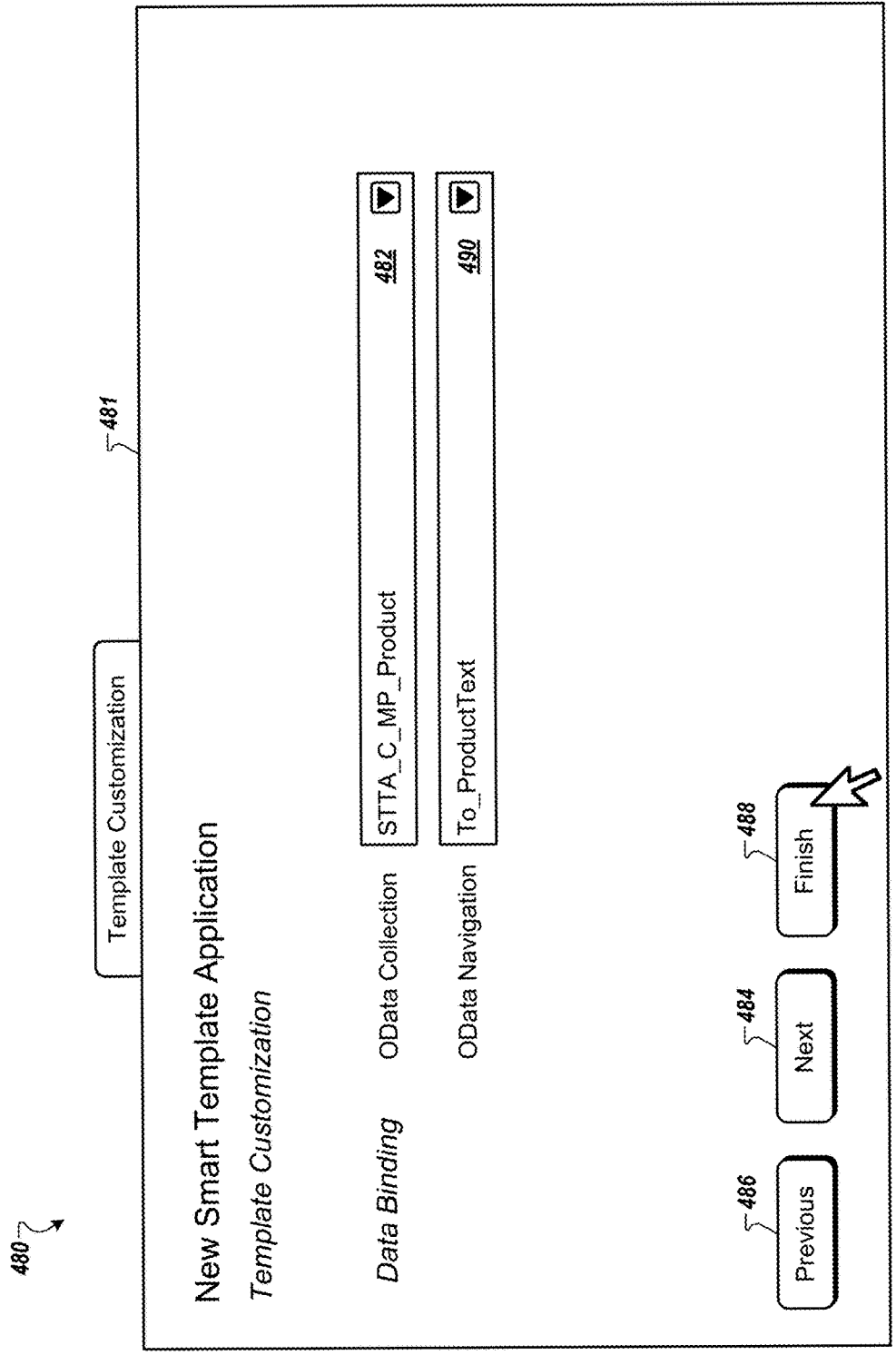
FIG. 4H illustrates example template customizations for use when creating and generating an enterprise application.

FIG. 4H illustrates example template customizations for use when creating and generating an enterprise application. The example template customizations are shown in a template customization tab (web page) 481 of the enterprise web IDE executing in the web browser. An example eighth step 480 in the creation of the enterprise application that uses smart templates is the selecting and specifying of data binding services in order to customize the smart template application and the subsequent smart template created by the smart template application. OData collection services (e.g., OData collection service 482) and OData navigation services (e.g., OData navigation service 490) are selected that can provide the binding of the data to the smart template application.

Once the template customization information is entered, a next button 484 can be selected in order to proceed to the next step in the creation of the enterprise application that uses smart templates. In some cases, a previous button 486 can be selected in order to return to a previous step (e.g., the example seventh step 470 as shown in FIG. 4G). In some cases, a finish button 488 can be selected. For example, a developer can select to execute (run) the smart template application from a developer dashboard or UI provided on a computing device. The smart template application can create (generate) a smart UI as shown, for example in FIG. 5A.

Figure 5A:
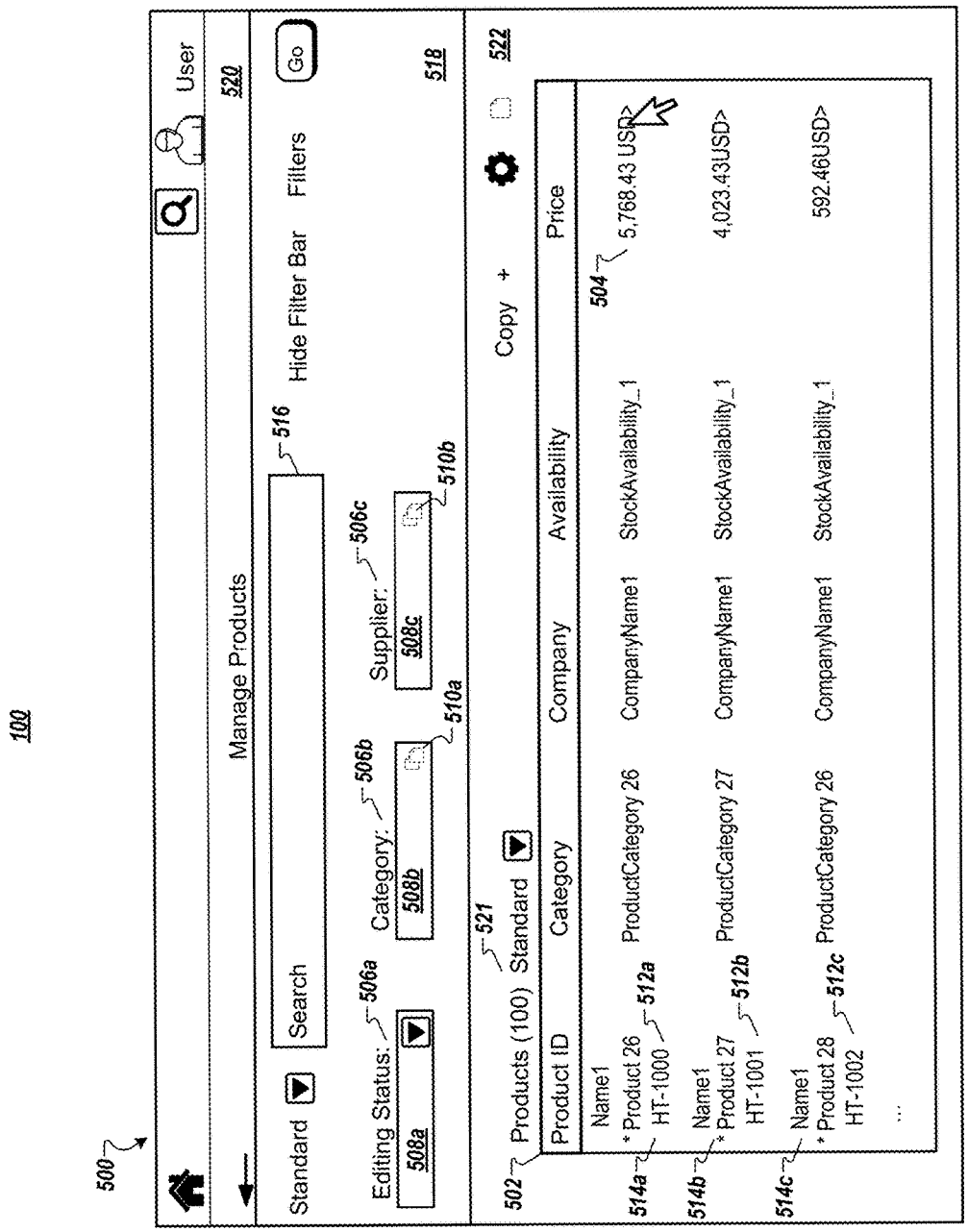
FIG. 5A shows an example UI for an enterprise application that utilizes a smart template.

FIG. 5A shows an example UI 500 for an enterprise application that utilizes a smart template. For example, referring to FIG. 2, a user of a desktop computing device (e.g., the computing device 206e) can view the UI 500 on a screen of a display device (e.g., the display device 228). The example UI 500 as shown in FIG. 5A can be for a list report of the enterprise application. The UI 500 includes a smart table (e.g., table 502) that includes semantic information for data included in (displayed in) or associated with the UI 500. The UI 500 also includes additional semantic information.

The UI includes a search field 516. The search field 516 can define if there is a search on an entity. The UI 500 includes semantics for defining the type of table (e.g., the table 502) that is used in the smart template for the UI 500. For example, a line item annotation semantic for the table 502 can defines which columns are visible in a default result set of the table 502. For example, a selection fields annotation can define what fields are shown (displayed in the UI 500, included in the UI 500) in a filter bar 518 included in the UI 500. The UI 500 includes fields with field labels 506a-c that are displayed in the UI 500. For example, a header information annotation can define the text for a table header (e.g., a table header 521).

The UI 500 includes selection fields 508a-c associated with each field label 506a-c, respectively. A user can select (or enter) information in the selection fields 508a-c related to data for display in the table 502 that is associated with a respective field included in the table 502. The UI 500 includes links to value lists (e.g., links 510a-b) that are associated with a respective selection field (e.g., selection fields 508b-c, respectively) for a respective field label (e.g., field labels 506b-c, respectively).

Individual code fields can be linked text fields 512a-c. For example, a user can select a text field and be directed to a code field for the smart table entry. The smart table 502 can include line item fields 514a-c.

Figure 5B:
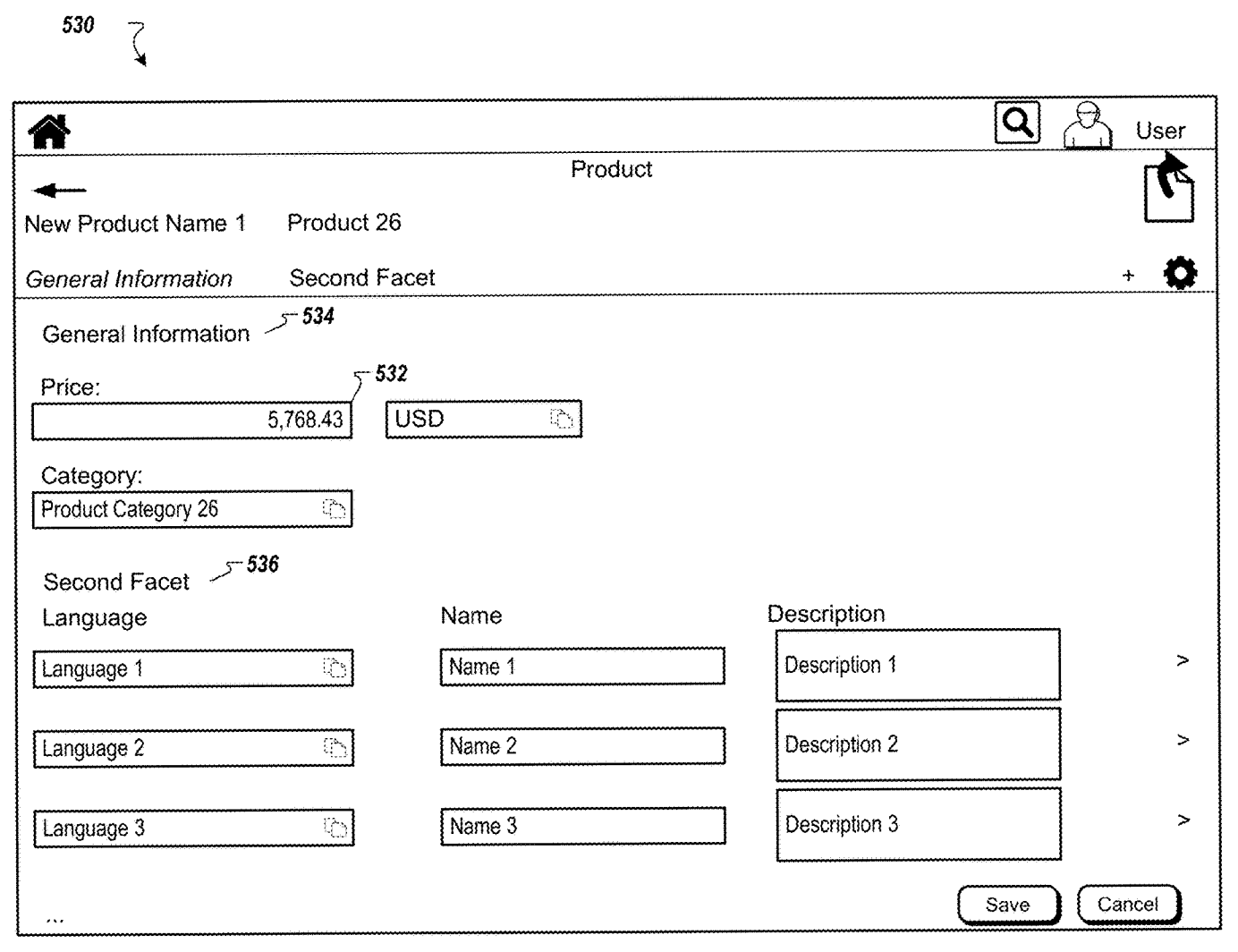

The table 502 can be considered a responsive table because one or more fields included in the table (e.g., a price field 504) if selected can provide an additional example UI 500 (another smart UI) as shown in FIG. 5B.

For example, a user can select the price field 504 in the UI 500. Based on the use of a smart template for the UI 500, FIG. 5B shows another example UI 530 for an enterprise application that utilizes a smart template. Responsive to the selection of the price field 504, the UI 530 is displayed. The UI 530 includes a user interface that allows for entry and interaction with data associated with a price for a product (e.g., the price as shown in a price field 532 for the product named Product 26). The information and data associated with the product can include general information 534 and a second facet 536 of data and information. The semantic information included in the UI 500 can include, but is not limited to, references between fields (e.g. Code→Text, Amount→Currency, Quantity→Unit, etc.), references from fields to data sources (e.g., Value Help, Data Navigation (Master-Detail), etc.), field purpose (e.g., selection, lineitem), field decoration (e.g., label), field control (e.g., mandatory, optional, readonly, hidden, etc.), and data purpose (e.g., contact data, address data, etc.).

Figure 5C:
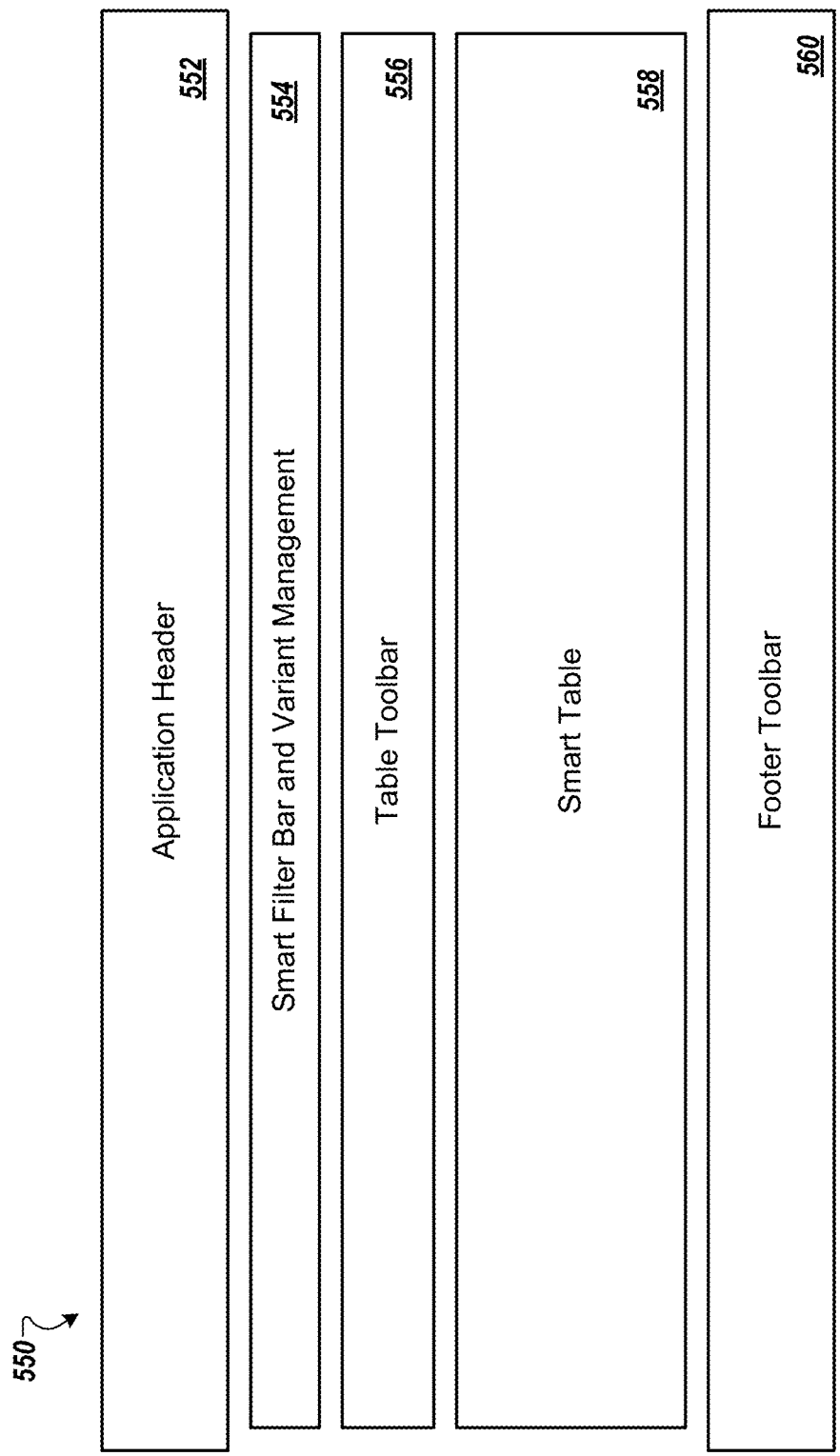
FIG. 5C is a block diagram showing a layout for a UI based on the use of a smart template.

FIG. 5C is a block diagram showing a layout 550 for a UI based on the use of a smart template. For example, the layout 550 can be a smart template list report layout (a list report floorplan). The layout 550 can be used for the example UI 500 shown in FIG. 5A which can be for a list report of the enterprise application. The layout 550 includes an application header 552 showing a name for the application (e.g., application header 520). The layout 550 includes a smart filter bar with variant management 554 (e.g., the filter bar 518). The layout 550 includes a table toolbar 556 (e.g., table toolbar 522). A table toolbar can provide for generic and application specific actions. The layout 550 includes a smart table with layout management 558 (e.g., the smart table 502). The layout 550 can include a footer toolbar 560 (e.g., the footer toolbar 132 as shown in FIG. 1F).

FIG. 6 shows example source code 600 for an example core data service (CDS) for a product view (e.g., the product view as shown in FIG. 5A) that includes semantic information. The source code 600 includes code for a line item field 602 and a selection field 604. The source code 600 includes code for an amount linked to currency 606, a field control 608, and field semantics 612. The source code 600 includes code for a link to a value list 610.

Figure 7A:
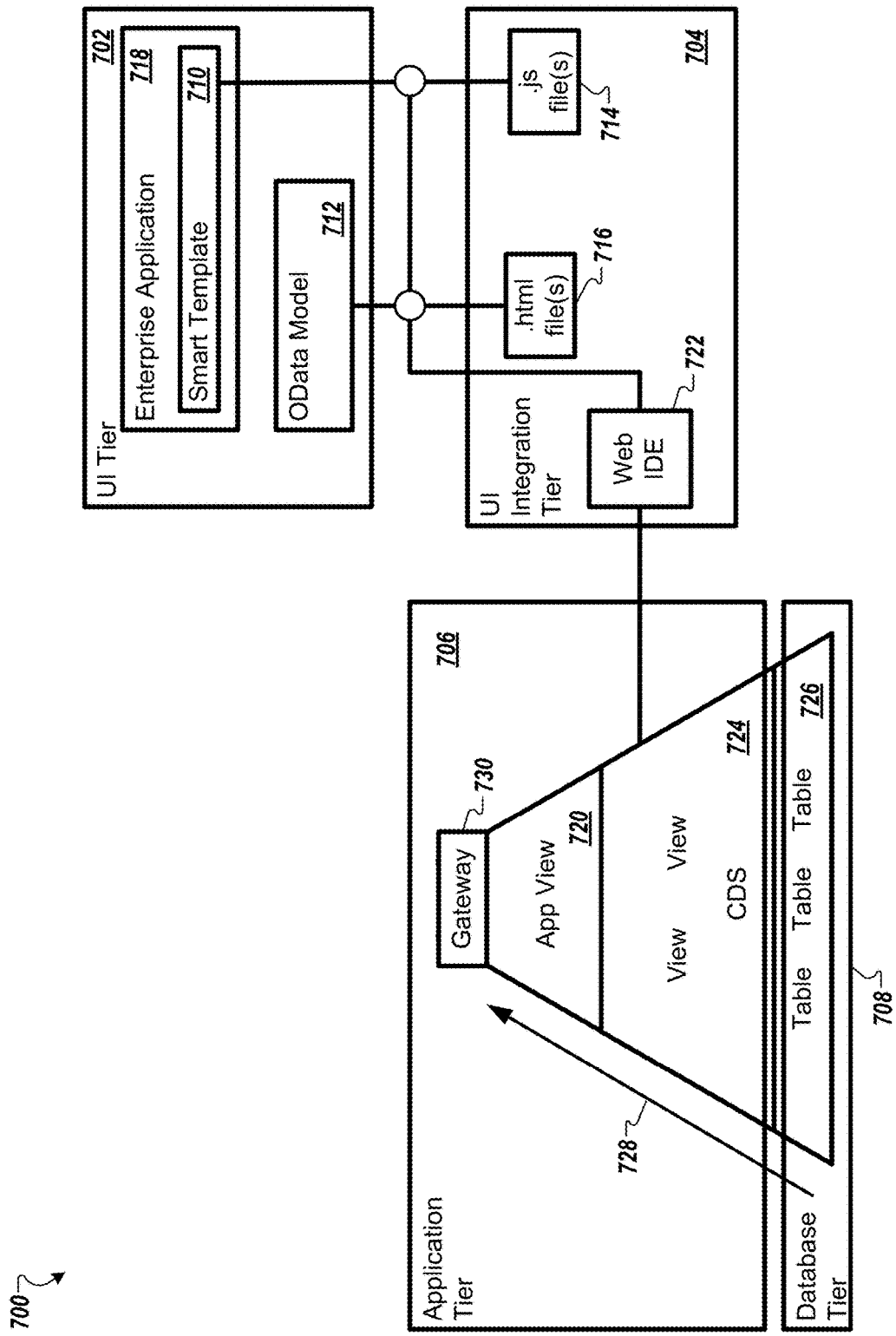
FIG. 7A is a block diagram illustrating layering and sources of annotations for use in smart templates.

FIG. 7A is a block diagram illustrating layering and sources of annotations 700 for use in smart templates. The layers include a UI tier 702, a UI integration tier 704, an application tier 706, and a database tier 708. The UI tier 702 includes an enterprise application 718 that includes a smart template 710 and an OData model 712. The UI tier 702 can be considered as a layer on top of the UI integration tier 704. The UI tier 702 can provide the smart template 710 and the OData model 712 for use in creating a UI based on a smart template. The UI integration tier 704 can provide local application scope by providing the functionality and development tools needed by a developer when for interfacing between the application tier 706 and the UI tier 702 when using smart templates.

The smart template 710 can access and execute a javascript file (e.g., .js file 714). The enterprise smart template 710 can execute the .js file to run client side JavaScript code in a web page of a web browser. The enterprise application 718 including the smart template 710 can include a view template and controller logic that can evaluate annotations at runtime. The OData model 712 includes data and merged annotations from application specific views included in an application view 720 of the application tier 706. The OData model 712 can interface with HyperText Markup Language (html) files (e.g., a .html file 716) included in the UI integration tier 704 providing the semantic and annotations needed to the html elements included in the .html file 716. The .html file 716 includes markup language for rendering a web page for the enterprise application 718 using the smart template 710. A web IDE 722 included in the UI integration tier 704 can execute (run) in a web browser application executing (running) on a computing device of a developer. A developer can interface with the web IDE 722 when creating a new project that incorporates at least one smart template (e.g., the smart template 710) in an enterprise application (e.g., the enterprise application 718). In some implementations, the OData model 712 can be interfaced to the web IDE 722.

The web IDE 722 can access one or more core data services (CDS) in a CDS view hierarchy 724 included in the application tier 706 for selection by a developer when creating an enterprise application (e.g., the enterprise application 718) that includes a smart template (e.g., the smart template 710). The core data services can provide the web IDE 722 with a shared data model that includes annotations across all enterprise applications. The database tier 708 can include one or more tables (e.g., table(s) 726) that include data for use by a smart templates (e.g., the smart template 710). A direction of increased annotation propagation (e.g., as shown by arrow 728) starts from the tables 726 included in the database tier 708 and increases through the CDS view hierarchy 724 to the application view 720. In some implementations, the more generic the semantic information included in a core data service, the deeper down (the lower) the location of the core data service in the CDS view hierarchy 724. CDS propagation of annotations can increase the consistency and development efficiency for an enterprise application that uses smart templates. In some implementations, generic defaults can be overridden with more specific annotations at an upper layer of the UI development tier (e.g., in the UI integration tier 704). The application tier 706 can include a gateway 730. The gateway 730 can allow for the connecting of devices, environments, and other platforms the application tier 706.

Figure 7B:
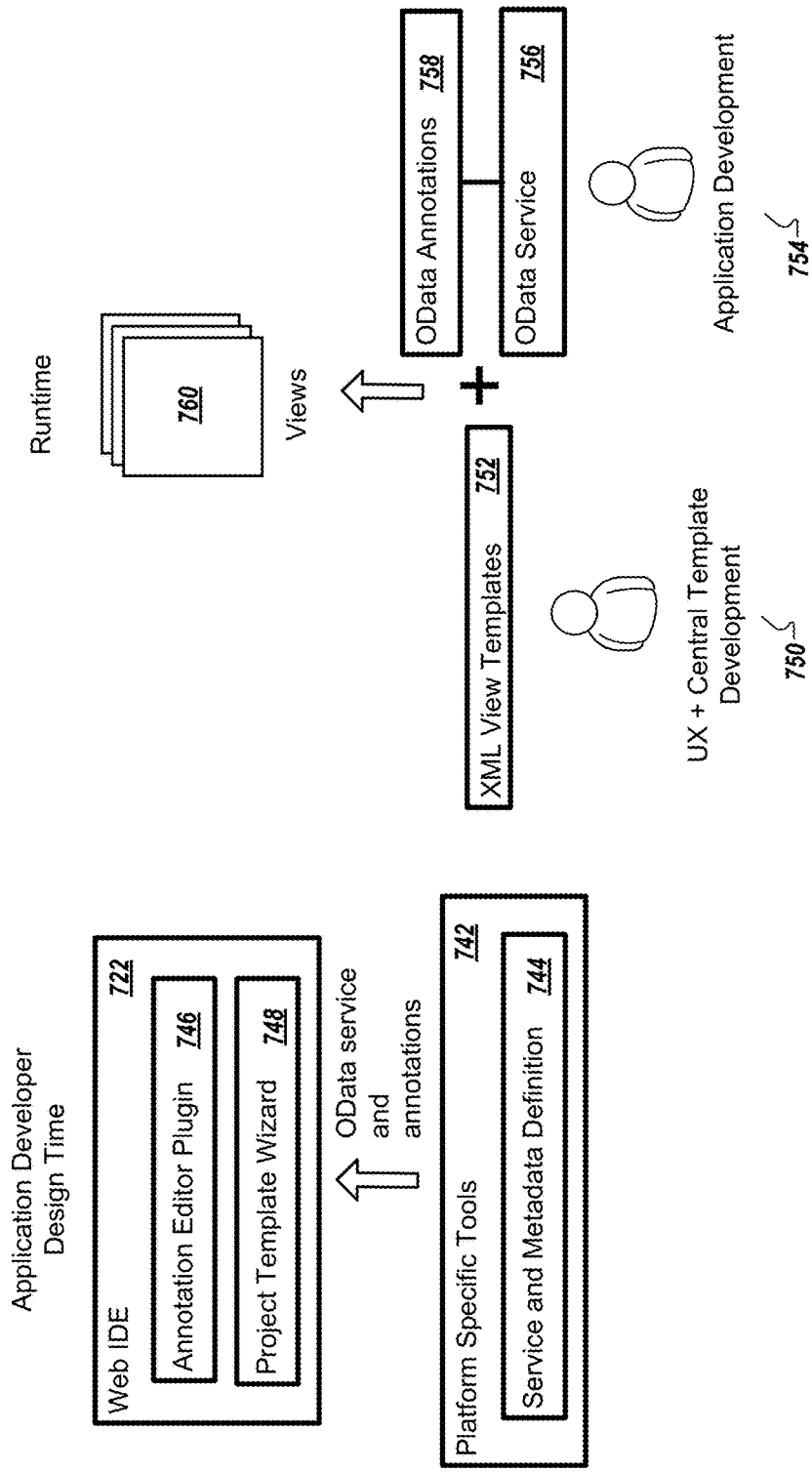
FIG. 7B is a block diagram illustrating how smart templates work, showing application developer design time aspects of the development process and runtime aspects of the development process.

FIG. 7B is a block diagram illustrating how smart templates work, showing application developer design time aspects of the development process and runtime aspects of the development process. At application development design time, platform specific tools 742 that include service and metadata definitions 744 can provide OData service and annotations to a web IDE (e.g., the web IDE 722 as shown in FIG. 7A). The web IDE can include an annotation editor plugin 746 and a project template wizard 748. As described, the web IDE 722 can use the project template wizard 748 to create a new project that incorporates smart template(s). The web IDE 722 can use the annotation editor plugin 746 when incorporating a smart template in a project. At runtime, a user experience (UX) and central template development 750 can interface with (use) one or more xml view templates (one or more smart templates) 752. For example, the xml view templates 752 can use smart controls. Application development 754 can interface with (use) OData services 756 along with OData annotations 758 in the xml view template 752 to create (generate) one or more views 760 (e.g., user interfaces) for an enterprise application.

Smart templates can be used to create enterprise application based on OData services and annotations that may not require JavaScript UI coding. An enterprise application based on smart templates can use predefined template views and controllers that can be centrally provided. As such, no application specific view instances are required. A runtime can interpret metadata and annotations of an underlying OData service. The runtime can use corresponding views for the enterprise application in a UI for the enterprise application at the startup of the execution of the enterprise application.

Predefined view templates and controllers can ensure UI design consistency across enterprise applications. A metadata driven development model can reduce an amount of frontend code needed per enterprise application, relying instead on commonly shared already existing and available code.

For example, smart templates can be applied to the development of UIs for a full screen application, a list report, an object page (e.g., the object page 124 as shown in FIG. 1E), an overview page (e.g., the overview page as shown in FIG. 1D), a draft, a nondraft, and a global edit flow.

Figure 8A:
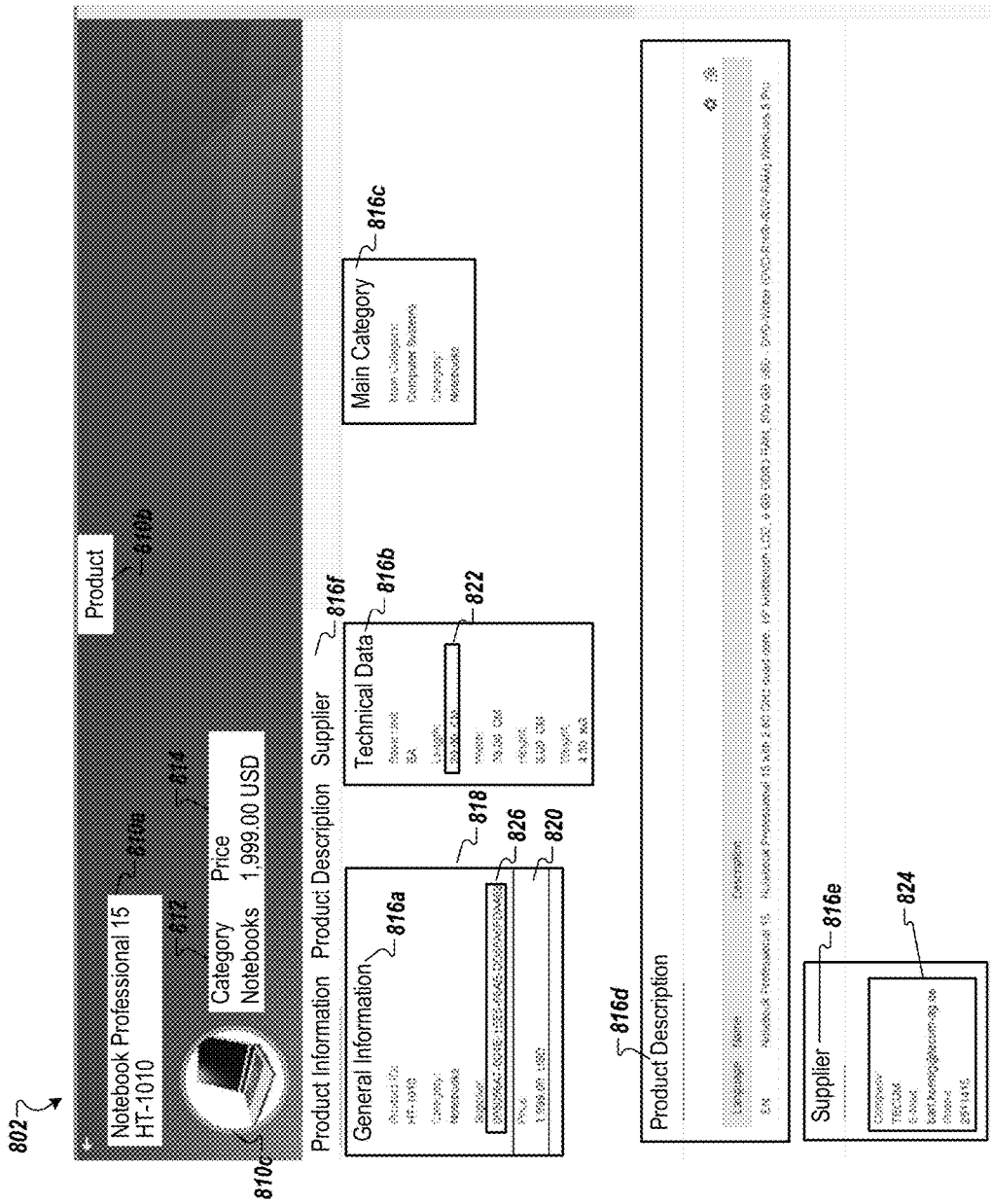

FIGS. 8A-F show smart templates as applied to the development of an object page. FIG. 8A is an example of an object page 802. FIGS. 8B-F show example annotations to one or more fields included in the UI for the object page 802 that provide the smart controls included as part of the smart template for the object page 802. FIG. 8B shows a header annotation 840 for a header information fields 810a-c, a product category annotation 842 for a product category field 812, and a product price annotation 844 for a product price field 814. FIGS. 8C-D shows UI facets annotations 846a-b for UI facet fields 816a-f. FIG. 8E shows a UI annotation 848 for a UI general information field 818 and a price annotation 850 for price field 820. FIG. 8F shows a text annotation 852, a contact annotation 854, and a navigation annotation 856 for a text field 822, a contact field 824, and a navigation field 826, respectively.

Figure 9A:
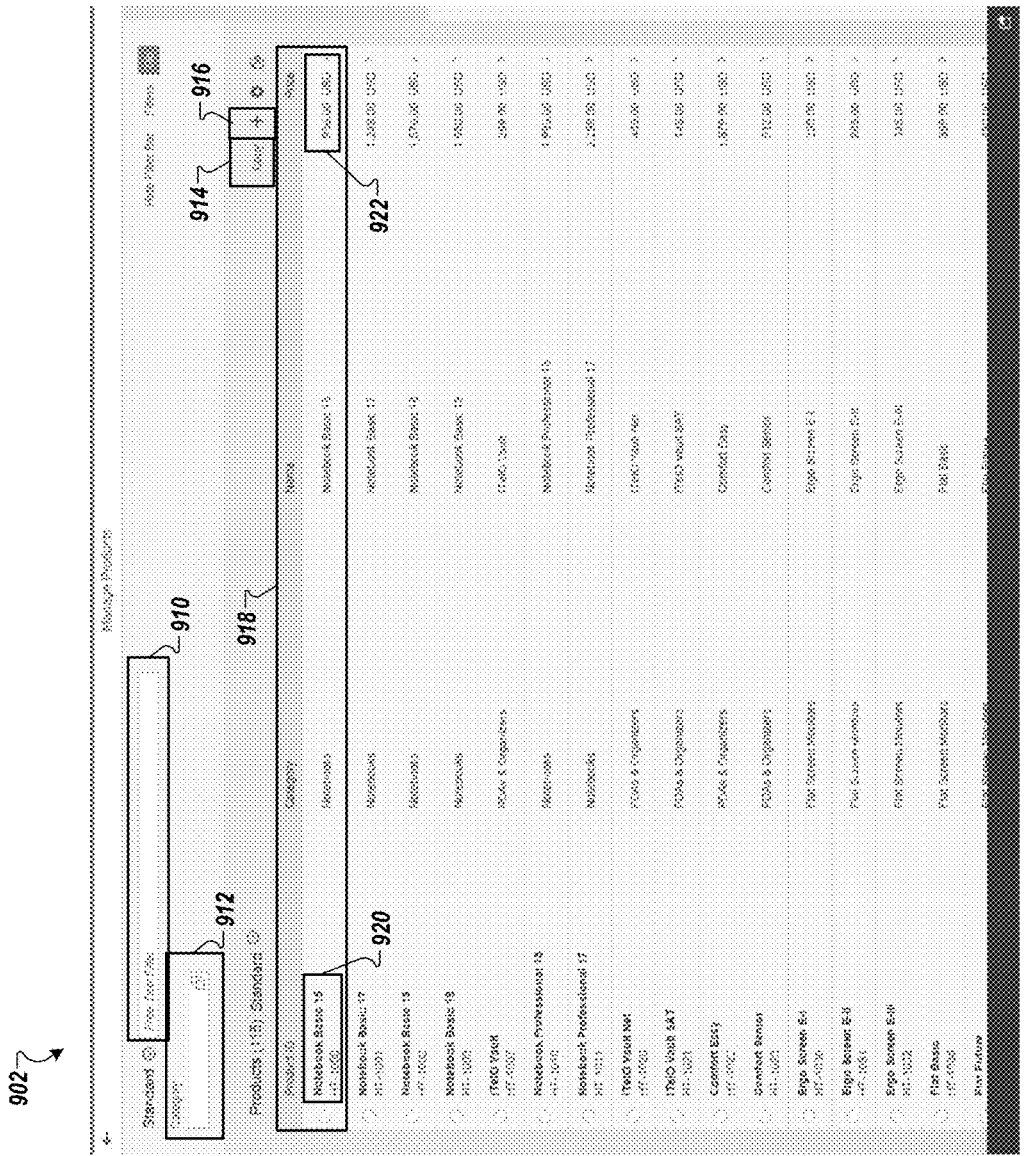

FIGS. 9A-D show smart templates as applied to the development of a list report. FIG. 9A is an example of a list report 902. FIGS. 9B-D show example annotations to one or more fields included in the UI for the list report 902 that provide the smart controls included as part of the smart template for the list report 902. FIG. 9B shows a search annotation 930 for a search field 910 and a category annotation 932 for a category field 912. FIG. 9C shows a line item annotation 934 for a UI copy control 914 and a capabilities annotation 936 for a UI insert control 916. FIG. 9D shows a line item annotation 938 for a general information field 918, a text annotation 940 for a text field 920, and a currency annotation 942 for price field 922.

Figure 10:
FIG. 10 shows another smart template as applied to the development of a list report.

FIG. 10 shows another smart template as applied to the development of a list report 1002. FIG. 9A can show a smart template for viewing on a display device included in a first type of computing device. FIG. 10 can show a smart template for viewing on a display device included in a second type of computing device. For example, the list report 902 can be the same list report 1002, where each list report 902, 1002 is viewed on a different type of display device. Referring to FIG. 2, the list report 902 can be viewed on the display device 228 included in the computing device 206e (e.g., a desktop computing device) while the list report 1002 can be viewed on the display device 220 included in the computing device 206a (e.g., a mobile computing device). The use of smart templates for the list report allows the list report to be easily and properly displayed on each of the display devices 228 and 220 without the need for special code. By using smart templates, UI consistency can be ensured with increasing efficiency of UI development over a plurality of different display devices and computing devices.

Figure 11:
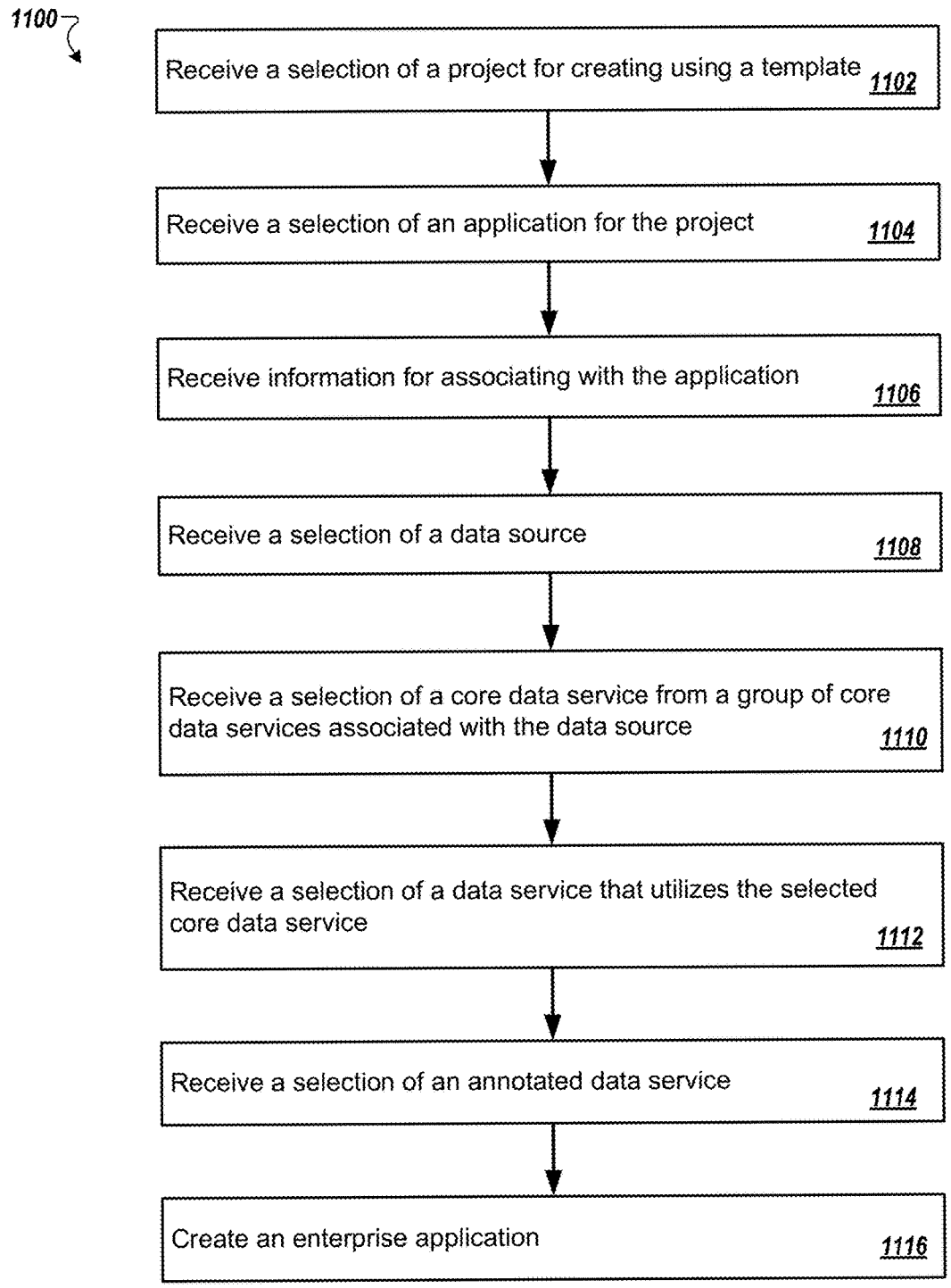
FIG. 11 is a block diagram of a flowchart showing an example method for implementing the creation of an enterprise application that utilizes smart templates.

FIG. 11 is a block diagram of a flowchart showing an example method 1100 for implementing the creation of an enterprise application that utilizes smart templates. In some implementations, the systems and processes described herein can implement the method 1100.

A selection of a project for creating using a template is received (block 1102). A selection of an application for the project is received (block 1104). Information for associating with the application is received (block 1106). A selection of a data source is received (block 1108). A selection of a core data service from a group of core data services associated with the data source is received (block 1110). The core data service can utilize a smart template. A selection of a data service that utilizes the selected core data service is received (block 1112). A selection of an annotated data service is received (block 1114). The enterprise application is created (block 1116). The creating of the enterprise application can be based on the smart template. The creating of the enterprise application can utilize the received information for associating with the application, the data source, the core data service, the data service, and the annotated data service.

Smart templates can offer one or more of the following features: reuse functionality that may not require specific programming; a common look and feel and UI behavior across all enterprise applications; edit mode control that allows for switching between display and edits modes and submitting changes; message handling; lauchpad integration; support for flexibility services; use of a web IDE for creation of the enterprise application; the control of the UI by smart templates using OData annotations which can semantically enrich OData metadata; multi-device support (e.g., support for multiple different types of computing devices that can include different type of display devices (e.g., the computing devices 206a-e and respective display devices 220, 222, 224, 226, and 228)); the use of status colors and icons in a smart template that can indicate level of criticality; header facets that can define the information to display in a header for the UI; help with values included in the UI; handling of draft documents including draft saving; the ability to extend a header area of an object page that uses a smart template; the support of multi-select using a new setting included in a list report that uses a smart template; support for smart link navigation for object pages that use a smart template where the smart link is in a smart table that passes a header parameter; and a drop-down menu for filtering edit states.

In some implementations, annotated OData services can be derived from the core data services for reuse, productivity, and consistency. The annotations can describe the semantics related to data for use by the smart template application. The use of smart templates refers to the annotations and the way in which the templates understand the semantics described by the annotations. The annotated services can connect a frontend of a UI for the enterprise application to a backend of the UI for the enterprise application.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for creating an enterprise application comprising:
   receiving, by a computing device, a selection of a project for creating using a template;
   receiving, by the computing device, a selection of an application for the project;
   receiving information for associating with the application;
   receiving a selection of a data source;
   receiving a selection of a core data service from a group of core data services associated with the data source, the core data service utilizing a smart template;
   receiving a selection of a data service that utilizes the selected core data service;
   receiving a selection of an annotated data service; and
   creating the enterprise application, the creating being based on the smart template and the creating utilizing the received information for associating with the application, the data source, the core data service, the data service, and the annotated data service.

2. The method of claim 1, wherein the creating of the enterprise application is performed using a web Integrated Development Environment (IDE).

3. The method of claim 2, wherein the web IDE executes on a web browser executing on the computing device.

4. The method of claim 3, wherein the data source, the core data service, the data service, and the annotated data service are included for selection in a data connection tab of the web IDE.

5. The method of claim 1, where the data source is an annotated Open Data Protocol (OData) source.

6. The method of claim 1,
   wherein the application is a smart template application;
   wherein the data service is an OData service;
   wherein the annotated service is an OData annotated service; and
   wherein the smart template application uses predefined template views and controllers that use the OData service and the OData annotated service.

7. The method of claim 6, wherein the OData annotated service adds semantics and structures to data provided by the data source.

8. The method of claim 6, wherein the smart template application uses the predefined template views and controllers at runtime to generate at least one view for the enterprise application.

9. A non-transitory, machine-readable medium having instructions stored thereon, the instructions, when executed by a processor, cause a computing device to:
   receive a selection of a project for creating using a template;
   receive a selection of an application for the project;
   receive information for associating with the application;
   receive a selection of a data source;
   receive a selection of a core data service from a group of core data services associated with the data source, the core data service utilizing a smart template;
   receive a selection of a data service that utilizes the selected core data service;
   receive a selection of an annotated data service; and
   create an enterprise application, the creating being based on the smart template and the creating utilizing the received information for associating with the application, the data source, the core data service, the data service, and the annotated data service.

10. The medium of claim 9, wherein the instructions when executed by the processor further cause the computing device to create the enterprise application using a web Integrated Development Environment (IDE).

11. The medium of claim 10, wherein the instructions when executed by the processor that further cause the computing device to create the enterprise application using a web Integrated Development Environment (IDE) execute on a web browser executing on the computing device.

12. The medium of claim 11, wherein the data source, the core data service, the data service, and the annotated data service are included for selection in a data connection tab of the web IDE.

13. The medium of claim 9, where the data source is an annotated Open Data Protocol (OData) source.

14. The medium of claim 9,
   wherein the application is a smart template application;
   wherein the data service is an OData service;
   wherein the annotated service is an OData annotated service; and
   wherein the smart template application uses predefined template views and controllers that use the OData data service and the OData annotated service.

15. The medium of claim 14, wherein the OData annotated service adds semantics and structures to data provided by the data source.

16. The medium of claim 14, wherein the smart template application uses the predefined template views and controllers at runtime to generate at least one view for the enterprise application.

17. A system comprising:
   at least one memory including instructions on a computing device; and
   at least one processor on the computing device, wherein the processor is operably coupled to the at least one memory and is arranged and configured to execute the instructions that, when executed, cause the processor to implement:

receiving, by the computing device, a selection of a project for creating using a template;

receiving, by the computing device, a selection of an application for the project;

receiving information for associating with the application;

receiving a selection of a data source;

receiving a selection of a core data service from a group of core data services associated with the data source, the core data service utilizing a smart template;

receiving a selection of a data service that utilizes the selected core data service;

receiving a selection of an annotated data service; and creating an enterprise application, the creating being based on the smart template and the creating utilizing the received information for associating with the application, the data source, the core data service, the data service, and the annotated data service.

18. The system of claim 17, wherein the application is a smart template application;

wherein the data service is an OData service;

wherein the annotated service is an OData annotated service; and wherein the smart template application uses predefined template views and controllers that use the OData data service and the OData annotated service.

19. The system of claim 18, wherein the OData annotated service adds semantics and structures to data provided by the data source.

20. The system of claim 18, wherein the smart template application uses the predefined template views and controllers at runtime to generate at least one view for the enterprise application.

* * * * *